United States Patent
Sugihara et al.

(10) Patent No.: US 10,049,822 B2
(45) Date of Patent: Aug. 14, 2018

(54) MONOMER LIQUID FOR OF CONDUCTIVE POLYMER PRODUCTION AND A MANUFACTURING METHOD OF AN ELECTROLYTE CAPACITOR USING THE SAME

(71) Applicant: TAYCA CORPORATION, Osaka-shi, Osaka (JP)

(72) Inventors: Ryosuke Sugihara, Osaka (JP); Taichi Yamaguchi, Osaka (JP); Yuhei Tsurumoto, Suita (JP)

(73) Assignee: TAYCA CORPORATION, Osaka (JP)

( * ) Notice: Subject to any disclaimer, the term of this patent is extended or adjusted under 35 U.S.C. 154(b) by 0 days.

(21) Appl. No.: 15/021,062

(22) PCT Filed: Sep. 3, 2014

(86) PCT No.: PCT/JP2014/073121
§ 371 (c)(1),
(2) Date: Mar. 10, 2016

(87) PCT Pub. No.: WO2015/037481
PCT Pub. Date: Mar. 19, 2015

(65) Prior Publication Data
US 2016/0225531 A1    Aug. 4, 2016

(30) Foreign Application Priority Data

Sep. 11, 2013 (JP) .................................. 2013-187814
Dec. 27, 2013 (JP) .................................. 2013-270757

(51) Int. Cl.
| | | |
|---|---|---|
| H01B 1/00 | (2006.01) | |
| B05D 5/12 | (2006.01) | |
| H01G 9/00 | (2006.01) | |
| H01B 1/12 | (2006.01) | |
| H01G 9/028 | (2006.01) | |
| C08G 61/12 | (2006.01) | |
| C08L 65/00 | (2006.01) | |
| C08G 73/02 | (2006.01) | |
| C08G 73/06 | (2006.01) | |
| H01G 9/15 | (2006.01) | |

(52) U.S. Cl.
CPC ............. *H01G 9/0036* (2013.01); *B05D 5/12* (2013.01); *C08G 61/124* (2013.01); *C08G 61/126* (2013.01); *C08G 73/026* (2013.01); *C08G 73/0611* (2013.01); *C08L 65/00* (2013.01); *H01B 1/124* (2013.01); *H01G 9/028* (2013.01); *H01G 9/15* (2013.01); *C08G 2261/12* (2013.01); *C08G 2261/1424* (2013.01); *C08G 2261/228* (2013.01); *C08G 2261/3223* (2013.01); *C08G 2261/3247* (2013.01); *C08G 2261/43* (2013.01); *C08G 2261/51* (2013.01); *C08G 2261/514* (2013.01); *C08G 2261/794* (2013.01)

(58) Field of Classification Search
CPC .......... H01B 1/00; H01B 1/124; H01B 1/127; H01B 1/128; C09D 5/24; B05D 5/12
See application file for complete search history.

(56) References Cited

U.S. PATENT DOCUMENTS

| | | | |
|---|---|---|---|
| 6,954,351 B2 * | 10/2005 | Konuma ................ | H01G 9/012 29/25.03 |
| 2007/0129534 A1 | 6/2007 | Ohata et al. | |
| 2010/0165548 A1 | 7/2010 | Sugihara | |
| 2011/0080690 A1 * | 4/2011 | Ning ..................... | H01G 9/028 361/525 |
| 2012/0018662 A1 | 1/2012 | Sugihara et al. | |

FOREIGN PATENT DOCUMENTS

| | | |
|---|---|---|
| JP | 2002-128877 A | 5/2002 |
| JP | 2003-160647 A | 6/2003 |
| JP | 2003-313317 A | 11/2003 |
| JP | 2004-265927 A | 9/2004 |
| JP | 2005-120363 A | 5/2005 |
| JP | 2007-119633 A | 5/2007 |
| JP | 2010-90324 A | 4/2010 |
| WO | 2006/085601 A1 | 8/2006 |
| WO | 2007/142051 A1 | 12/2007 |
| WO | 2011/068026 A1 | 6/2011 |

OTHER PUBLICATIONS

English language machine translation of JP 2010-090324 A (pub 2010).*
International Search Report dated Dec. 9, 2014, issued in counterpart International Application No. PCT/JP2014/073121 (2 pages).

* cited by examiner

*Primary Examiner* — Mark Kopec
(74) *Attorney, Agent, or Firm* — Westerman, Hattori, Daniels & Adrian, LLP

(57) ABSTRACT

There is provided a monomer liquid for conductive polymer production, comprising: at least one monomer selected from the group consisting of thiophene or its derivatives, pyrrole or its derivative and aniline or its derivative; and at least one kind selected from the group consisting of a naphthalene sulfonic acid type heterocyclic compound and a benzene sulfonic acid type heterocyclic compound in which no hydroxyl group is directly connected to the benzene ring, wherein said at least one kind is dispersed in said at least one monomer. Also, there is provided a production of an electrolyte capacitor by using the monomer liquid for conductive polymer production is explained. In particular, imidazoles are favorable as the naphthalene sulfonic acid type heterocyclic compound and the benzene sulfonic acid type heterocyclic compound.

18 Claims, No Drawings

MONOMER LIQUID FOR OF CONDUCTIVE POLYMER PRODUCTION AND A MANUFACTURING METHOD OF AN ELECTROLYTE CAPACITOR USING THE SAME

TECHNICAL FIELD

The present invention relates to a monomer liquid for conductive polymer production, which disperses a material to become a dopant of the conductive polymer in monomers, and a manufacturing method of an electrolyte capacitor using the same.

TECHNICAL BACKGROUND

For example, the conductive polymer has such a high conductivity that it is used as an electrolyte of solid electrolyte capacitors such as in tantalum electrolyte capacitors, aluminum electrolyte capacitors, and niobium electrolyte capacitors.

As such conductive polymers in the application, used are ones obtained by applying chemical oxidation polymerization or electrolytic oxidation polymerization to polymeric monomers such as thiophene or its derivative, pyrrole or its derivative, and aniline or its derivative.

As a dopant, an organic sulfonic acid can be mainly used to carry out chemical oxidation polymerization of a polymerizable monomer such as thiophene or its derivative as mentioned above. In particular, it is said that an aromatic sulfonic acid is suitable. As an oxidant, a transition metal is used. In particular, it is said that ferric compound is suitable. Usually, a ferric salt of aromatic sulfonic acid can be used to serve as a dopant and oxidant upon the chemical oxidation polymerization of a polymerizable monomer such as thiophene or its derivative.

Among the ferric salts of aromatic sulfonic acid, it was reported as follows: Particularly useful are ferric toluenesulfonate, ferric methoxybenzene sulfonate and etc. In order to synthesize a conductive polymer using them, they are used as a dopant and oxidant and mixed with a polymerizable monomer such as thiophene or its derivative. These processes are simple and suitable for industrialization (see patent reference No. 1, and patent reference No. 2).

However, there is a problem such as inferior heat resistance and large leak current in case of the electrolyte capacitor prepared by using a conductive polymer obtained by using the ferric salts of aromatic sulfonic acid as an oxidant and dopant agent. This is considered because iron is not completely removed from the conductive polymer, the iron being used as an oxidant upon preparing the conductive polymer used as a solid electrolyte, and therefore, the iron remains in the conductive polymer.

Therefore, an oxidant of a non-iron salt type is considered. For example, it was reported to use one which has mixed ammonium persulfate aqueous solution with butylamine phenolsulfonate aqueous solution to serve as a solution of an oxidant and dopant agent (Patent Reference No. 3).

The electrolyte capacitor using a solid electrolyte of a conductive polymer prepared by using an oxidant and dopant agent of such a non-iron salt type has improved the heat resistance and reduced the leak current, compared with the electrolyte capacitor using a conductive polymer as a solid electrolyte prepared by using an oxidant and dopant agent of an iron salt type. However, the ammonium persulfate is deteriorated as time passes, so that unless such an oxidant and dopant agent solution is used immediately after it is prepared, it must be disposed of not only with ammonium persulfate that is cheap, but also butylamine phenolsulfonate that is expensive. Therefore, such an oxidant and dopant agent solution must have been prepared at the same time as the production of the electrolyte capacitor.

Then, in order to solve the problem associated with the preservation of the oxidant and dopant agent solution as explained above, it was reported to make a solution of a dopant such as 2-methylimidazole naphthalenesulfonate, separate from another solution of ammonium persulfate as an oxidant (Patent Reference No. 4).

However, in this case at the time of production of the electrolyte capacitor, 2-methylimidazole naphthalenesulfonate and ammonium persulfate react on the surface of a capacitor element to form a salt, which resulted in a lower capacity (capacitance) than expected since the dopant and the oxidant tend to be difficult to enter the inside of the capacitor element.

PRIOR ART REFERENCES

Patent References

Patent Reference No. 1: Japanese Laid-Open Patent Publication No. 2003-160647

Patent Reference No. 2: Japanese Laid-Open Patent Publication No. 2004-265927

Reference No. 3: International Patent Publication No. 2006-085601

Patent Reference No. 4: Japanese Laid-Open Patent Publication No. 2007-119633

SUMMARY OF THE INVENTION

The Objectives to Solve by the Invention

In view of the circumstances above, the objective of the present invention is to provide a monomer liquid for conductive polymer production, which can produce an electrolyte capacitor having a low (small) ESR, superior heat resistance and low leak current, and reliability of preservation properties. Using it, the objective of the present invention is also to provide an electrolyte capacitor having the features above.

Means to Solve the Problem

Namely, in order to solve the problems above, the present invention is to provide a monomer liquid for conductive polymer production, in which into at least one monomer selected from the group consisting of thiophene or its derivatives, pyrrole or its derivative and aniline or its derivative, at least one kind selected from the group consisting of a naphthalene sulfonic acid type heterocyclic compound and a benzene sulfonic acid type heterocyclic compound in which no hydroxyl group is directly connected to the benzene ring is dispersed.

In other words, there is provided a monomer liquid for conductive polymer production, in which into at least one monomer selected from the group consisting of thiophene or its derivatives, pyrrole or its derivative and aniline or its derivative, at least one kind selected from the group consisting of a naphthalene sulfonic acid type heterocyclic compound and a benzene sulfonic acid type heterocyclic compound in which no hydroxyl group is directly connected to the benzene ring is dispersed.

As the naphthalene sulfonic acid type heterocyclic compound to be used in the present invention, it is preferable to use at least one kind selected from the group consisting of naphthalene monosulfonic acid type heterocyclic compound and naphthalene trisulfonic acid type heterocyclic compounds. It is also preferable to use the naphthalene sulfonic acid type heterocyclic compound which includes a nitrogen atom in the heterocyclic ring. Here, the heterocyclic compound moiety in the naphthalene sulfonic acid type heterocyclic compound can include a nitrogen atom in the heterocycle such as 2-methylimidazole, 2-ethyl-4-methylimidazole, imidazole, 1-methylimidazole, 4-methylimidazole, 2-methyl-4-ethyl imidazole, triazole, triazine, pyridine, morpholine, and piperazine. In particular, imidazoles are preferable.

Also, the examples of the naphthalene sulfonic acid type heterocyclic compound satisfying the requirements above can include, for example, 2-methylimidazole naphthalenesulfonate, 2-methylimidazole naphthalenetrisulfonate, 2-ethyl-4-methylimidazole naphthalenesulfonate, 2-ethyl-4-methylimidazole naphthalenetrisulfonate, 4-methylimidazole naphthalenesulfonate, triazole naphthalenesulfonate, imidazole naphthalenetrisulfonate, 1-methylimidazole naphthalenetrisulfonate, 2-methyl-4-ethylimidazole naphthalenetrisulfonate, triazine naphthalenetrisulfonate, pyridine naphthalenetrisulfonate, morpholine naphthalenetrisulfonate, and piperazine naphthalenetrisulfonate.

The benzene sulfonic acid type heterocyclic compound used in the present invention do not have a hydroxyl group directly connected to the benzene ring (i.e., one which does not have a hydroxyl group connected to the constitution carbons of the benzene ring). As the benzene sulfonic acid type heterocyclic compound, it is preferable to use a benzene sulfonic acid heterocyclic compound, a benzene sulfonic acid heterocyclic compound having an alkyl group, benzene sulfonic acid heterocyclic compound having an alkoxy group, and a benzene sulfonic acid heterocyclic compound having a nitro group. Also, it is preferable to use a benzene sulfonic acid heterocyclic compound including a nitrogen atom in the heterocyclic ring. Here, the heterocyclic compound moiety in the benzene sulfonic acid type heterocyclic compound can include a nitrogen atom in the heterocycle such as 2-methylimidazole, 2-ethyl-4-methylimidazole, imidazole, 1-methylimidazole, 4-methylimidazole, 2-methyl-4-ethylimidazole, triazole, triazine, pyridine, morpholine, and piperazine. In particular, imidazoles are preferable.

Preferable examples that can satisfy the conditions of the benzene sulfonic acid heterocyclic compound can include 2-methylimidazole benzenesulfonate, 2-methylimidazole toluenesulfonate, 2-methylimidazole methoxybenzenesulfonate, 2-methylimidazole nitrobenzenesulfonate, and 2-methylimidazole cumenesulfonate.

Also, in the preparation of the monomer liquid for conductive polymer production as mentioned above, preferable is a mass ratio of 1:0.1 to 0.1:1 regarding a monomer versus at least one kind selected from the group consisting of a naphthalene sulfonic acid type heterocyclic compound and a benzene sulfonic acid type heterocyclic compound in which no hydroxyl group is directly connected to the benzene ring. When an alcohol having a carbon number of 1 to 4 is added to the monomer liquid for conductive polymer production so as to dilute the monomer liquid for conductive polymer production, handling characteristics during the production of electrolyte capacitors can be improved without deteriorating its properties.

An example of the production of an electrolyte capacitor by using the monomer liquid for conductive polymer production of the present invention is as follows: For example, after a capacitor element is impregnated with the monomer liquid for conductive polymer production of the present invention, the capacitor element is impregnated with an oxidant solution. Then, a process to polymerize the monomer is carried out at least one time, thereby forming a solid electrolyte layer made of the conductive polymer.

In addition, the electrolyte capacitor can be prepared as follows. Namely, after the solid electrolyte layer is formed by using the monomer liquid for conductive polymer production of the present invention, at least one time of a process to be immersed in a conductive polymer dispersion liquid followed by being dried can be applied, thereby forming additional solid electrolyte layer made of a conductive polymer, so as to prepare an electrolyte capacitor.

Furthermore, the electrolyte capacitor can be prepared as follows. Namely, after forming a solid electrolyte layer by carrying out at least one time of a process to be immersed in a conductive polymer dispersion liquid followed by being dried, additional solid electrolyte layer made of a conductive polymer is formed by using the monomer liquid for conductive polymer production of the present invention, and then it is subject to at least one time of a step of being impregnated with a conductive polymer dispersion liquid and dried, thereby forming yet additional solid electrolyte layer made of a conductive polymer, so as to prepare an electrolyte capacitor.

Effects of the Invention

According to the present invention, there can be provided a monomer liquid for conductive polymer production, which can produce an electrolyte capacitor having a low ESR, superior heat resistance and low leak current, and reliability of preservation properties.

Also, according to the monomer liquid for conductive polymer production of the present invention, a conductive polymer can be prepared, for example, by using a non-iron salt type oxidant such as ammonium persulfate. Therefore, unlike the case when using an oxidant of an iron salt type, the deterioration of the heat resistance and the increase of the leak current occurred do not occur. Thus, an electrolyte capacitor with low ESR, superior heat resistance, and low leak current can be produced.

Also, the dopant in the monomer liquid for conductive polymer production of the present invention has the feature below. It is superior in the heat resistance, since it is made of at least one kind selected from the group consisting of a naphthalene sulfonic acid type heterocyclic compound and a benzene sulfonic acid type heterocyclic compound in which no hydroxyl group is directly connected to the benzene ring. Therefore, compared with a phenol sulfonic acid type compound, the electrolyte capacitor prepared by using it can be superior in the heat resistance.

Furthermore, the monomer liquid for conductive polymer production of the present invention is comprised of a monomer and a dopant. Therefore, in the production of the electrolyte capacitor using the monomer liquid for this conductive polymer production, the capacitor element made of a porous metal body such as tantalum sintering body can be impregnated with the monomer liquid for conductive polymer production well inside thereof. At this condition, an oxidant later impregnated with can encounter it to cause a polymerization reaction. Therefore, an electrolyte capacitor with a large capacity (capacitance) can be produced.

EMBODIMENTS TO CARRY OUT THE INVENTION

In the monomer liquid for conductive polymer production of the present invention, one of particular features is to use a dopant, that is, at least one kind selected from the group consisting of a naphthalene sulfonic acid type heterocyclic compound and a benzene sulfonic acid type heterocyclic compound in which no hydroxyl group is directly connected to the benzene ring. First of all, the naphthalene sulfonic acid type heterocyclic compound is explained.

As the naphthalene sulfonic acid type heterocyclic compound to be used in the present invention, examples thereof can include a naphthalene monosulfonic acid type heterocyclic compound, a naphthalene disulfonic acid type heterocyclic compound, and a naphthalene trisulfonic acid type heterocyclic compound. Among these compounds, the naphthalene monosulfonic acid type heterocyclic compound and the naphthalene trisulfonic acid type heterocyclic compound are preferable since they are easily available.

The heterocycle of the naphthalene sulfonic acid type heterocyclic compound can be one composed by including nitrogen atom, one composed by including oxygen atom, and one composed by including sulfur atom, as well as one composed by including two or more kinds of nitrogen atom, oxygen atom and sulfur atom. In particular, one composed by including nitrogen atom can be preferable. As the heterocyclic compound including nitrogen atom in the heterocycle can include 2-methylimidazole, 2-ethyl-4-methylimidazole, imidazole, 1-methylimidazole, 4-methylimidazole, 2-methyl-4-ethylimidazole, triazole, triazine, pyridine, morpholine and piperazine. In particular, imidazoles are preferable. Namely, the heterocyclic compound moiety in the naphthalene sulfonic acid type heterocyclic compound can include a nitrogen atom in the heterocycle, such as 2-methylimidazole, 2-ethyl-4-methylimidazole, imidazole, 1-methylimidazole, 4-methylimidazole, 2-methyl-4-ethylimidazole, triazole, triazine, pyridine, morpholine, and piperazine. In particular, imidazoles are preferable.

Also, suitable examples of the naphthalene monosulfonic acid type heterocyclic compound as mentioned above can include naphthalene monosulfonic acid type imidazoles such as 2-methylimidazole naphthalenesulfonate, 2-ethyl-4-methylimidazole naphthalenesulfonate, imidazole naphthalenesulfonate, 1-methylimidazole naphthalenesulfonate, 1-ethylimidazole naphthalenesulfonate, 2-methyl-4-ethylimidazole naphthalenesulfonate, 1-butylimidazole naphthalenesulfonate, 2-ethylimidazole naphthalenesulfonate, 4-methylimidazole naphthalenesulfonate, 1,2-dimethylimidazole naphthalenesulfonate, 2-undecylimidazole naphthalenesulfonate, 2-phenylimidazole naphthalenesulfonate, 1-vinylimidazole naphthalenesulfonate, and 1-allylvinylimidazole naphthalenesulfonate; as well as triazole naphthalenesulfonate, triazine naphthalenesulfonate, pyridine naphthalenesulfonate, morpholine naphthalenesulfonate, and piperazine naphthalenesulfonate. Furthermore, ones include naphthalene ring having connected with alkyl group, vinyl group, formyl group, hydroxyl group, carboxyl group, amino group, and nitro group can be used.

In the present invention, the term, i.e., naphthalene sulfonic acid type heterocyclic compound, is used, not using a term, naphthalene sulfonic acid heterocyclic compound. By inserting the word "type," the invention intends to include ones in which a group such as alkyl group is connect to the naphthalene nucleus, within the term, naphthalene sulfonic acid type heterocyclic compound used in the present invention.

Here, as the naphthalene sulfonic acid type heterocyclic compound, it is particularly preferable to use at least one kind selected from the group consisting of a naphthalene monosulfonic acid heterocyclic compound and a naphthalene trisulfonic acid heterocyclic compound, in which a group such as alkyl group is not connected to the naphthalene ring. Among them, the naphthalene trisulfonic acid heterocyclic compound is most preferable.

When listing specific examples of the naphthalene trisulfonic acid type heterocyclic compound, the number of sulfonic acid groups is expressed by adding a term "tri," such as an expression of e.g., 2-methylimidazole naphthalenetrisulfonate. By contrast, generally speaking, there is a rule that a term "mono" is not often added to express specific examples of the monosulfonic acid system heterocyclic compound. This specification complies with such a rule, and therefore, when listing a naphthalene monosulfonic acid type heterocyclic compound, the term "mono" is not added, like e.g., 2-methylimidazole naphthalenesulfonate.

Suitable examples of the naphthalene trisulfonic acid type heterocyclic compound as mentioned above can include naphthalene trisulfonic acid type imidazoles such as 2-methylimidazole naphthalenetrisulfonate, 2-ethyl-4-methylimidazole naphthalenetrisulfonate, imidazole naphthalenetrisulfonate, 1-methylimidazole naphthalenetrisulfonate, 1-ethylimidazole naphthalenetrisulfonate, 2-methyl-4-ethylimidazole naphthalenetrisulfonate, 1-butylimidazole naphthalenetrisulfonate, 2-ethylimidazole naphthalenetrisulfonate, 4-methylimidazole naphthalenetrisulfonate, 1,2-dimethylimidazole naphthalenetrisulfonate, 2-undecylimidazole naphthalenetrisulfonate, 2-phenylimidazole naphthalenetrisulfonate, 1-vinylimidazole naphthalenetrisulfonate, and 1-allylvinylimidazole naphthalenetrisulfonate; as well as triazole naphthalenetrisulfonate, triazine naphthalenetrisulfonate, pyridine naphthalenetrisulfonate, morpholine naphthalenetrisulfonate, and piperazine naphthalenetrisulfonate. Furthermore, ones include naphthalene ring having connected to alkyl group, vinyl group, formyl group, hydroxyl group, carboxyl group, amino group, and nitro group can be used.

In the present invention, as the benzene sulfonic acid type heterocyclic compound in which no hydroxyl group is directly connected to the benzene ring (which may be simply referred to as "benzene sulfonic acid type heterocyclic compound") can include, e.g., benzene sulfonic acid heterocyclic compound (i.e., benzene sulfonic acid heterocyclic compound in which no substituent other than sulfone acid group is connected to the benzene ring), benzene sulfonic acid heterocyclic compound having an alkyl group, benzene sulfonic acid heterocyclic compound having an alkoxy group, and benzene sulfonic acid heterocyclic compound having a nitro group.

Also, not only one substituent such as alkyl group, alkoxy group and nitro group is connected to the benzene ring, but also two or more substituents can be connected to the benzene ring. The carbon number of the alkyl group as mentioned above can be 1 to 4, and therefore, methyl group, ethyl group, propyl group, and butyl group are preferable. The carbon number of the alkoxy group as mentioned above can be 1 to 4, and therefore, methoxy group, ethoxy groups, propoxy group, butoxy group are preferable.

Preferable examples are discussed by exemplifying a benzene sulfonic acid heterocyclic compound having an alkyl group in which one alkyl group is connected to the benzene ring. For example, methylbenzene sulfonic acid heterocyclic compound (i.e., toluenesulfonic acid heterocyclic compound), ethylbenzene sulfonic acid heterocyclic compound, propyl benzene sulfonic acid heterocyclic compound, and butyl benzene sulfonic acid heterocyclic compound can be exemplified. Regarding the propyl group and the butyl group as mentioned above, they can be a straight chain or a branched chain. Preferable examples are discussed by exemplifying a benzene sulfonic acid heterocyclic compound having an alkoxy group in which one alkoxy group is connected to the benzene ring. For example, methoxybenzene sulfonic acid heterocyclic compound, ethoxybenzene sulfonic acid heterocyclic compound, propoxybenzene sulfonic acid heterocyclic compound, and butoxybenzene sulfonic acid heterocyclic compound can be exemplified. Regarding the propoxy group and the butoxy group as mentioned above, they can be a straight chain or a branched chain.

In the same manner as the heterocycle of the naphthalene sulfonic acid type heterocyclic compound, the heterocycle of the benzene sulfonic acid type heterocyclic compound can be one composed by including nitrogen atom, one composed by including oxygen atom, and one composed by including sulfur atom, as well as one composed by including two or more kinds of nitrogen atom, oxygen atom and sulfur atom. In particular, one composed by including nitrogen atom can be preferable. As the heterocyclic compound including nitrogen atom in the heterocycle, the example can include 2-methylimidazole, 2-ethyl-4-methylimidazole, imidazole, 1-methylimidazole, 4-methylimidazole, 2-methyl-4-ethylimidazole, triazole, triazine, pyridine, morpholine, and piperazine. In particular, imidazole is preferable. Namely, the heterocyclic compound moiety in the benzene sulfonic acid type heterocyclic compound can include nitrogen atom in the heterocycle such as 2-methylimidazole, 2-ethyl-4-methylimidazole, imidazole, 1-methylimidazole, 4-methylimidazole, 2-methyl-4-ethylimidazole, triazole, triazine, pyridine, morpholine, and piperazine. In particular, imidazole is preferable.

Also, suitable examples of the benzene sulfonic acid type heterocyclic compound as mentioned above can include imidazole naphthalenesulfonates, such as 2-methylimidazole benzenesulfonate, 2-ethyl-4-methylimidazole benzenesulfonate, imidazole benzenesulfonate, 1-methylimidazole benzenesulfonate, 1-ethylimidazole benzenesulfonate, 1-butylimidazole benzenesulfonate, 2-ethylimidazole benzenesulfonate, 4-methylimidazole benzenesulfonate, 1,2-dimethylimidazole benzenesulfonate, 2-undecylimidazole benzenesulfonate, 2-phenylimidazole benzenesulfonate, 1-vinylimidazole benzenesulfonate, and 1-allylvinylimidazole benzenesulfonate; as well as triazole benzenesulfonate, triazine benzenesulfonate, pyridine benzenesulfonate, morpholine benzenesulfonate, and piperazine benzenesulfonate. Furthermore, ones including benzene ring having connected with alkyl group, vinyl group, formyl group, hydroxyl group, carboxyl group, amino group, and nitro group can be used.

Regarding the benzene sulfonic acid heterocyclic compound having an alkyl group, the benzene sulfonic acid heterocyclic compound having an alkoxy group, and the benzene sulfonic acid heterocyclic compound having a nitro group, the heterocyclic compound combined with the benzene sulfonic acid moiety can include the ones similar to those listed as suitable heterocyclic compounds for the benzene sulfonic acid heterocyclic compounds mentioned above. Among them, particularly suitable examples thereof can include 2-methylimidazole toluenesulfonate, 2-methylimidazole methoxybenzenesulfonate, and 2-methylimidazole nitrobenzenesulfonate, 2-methylimidazole cumenesulfonate (i.e., 2-methylimidazole isopropylbenzenesulfonate).

In the same manner as the term "naphthalene sulfonic acid type heterocyclic compound," in the present invention, the term, "benezene sulfonic acid type heterocyclic compound" is used. By inserting the word "type," the invention intends to include ones in which a group such as alkyl group, alkoxy group and nitro group is connect to the benzene ring, within the term "benezene sulfonic acid type heterocyclic compound" used in the present invention.

Also, regarding the benzene sulfonic acid heterocyclic compound, it requires that no hydroxyl group is directly connected to the benzene ring. For example, 2-methylimidazole phenolsulfonate has one hydroxyl group directly connected to the benzene ring. As shown in Comparative Example 3 as discussed later, it does not dissolve in an ethanol solution including ethylenedioxythiophene ethylenedioxythiophene at all. Therefore, it cannot be prepared into a desirable monomer liquid for conductive polymer production.

In the present invention, the monomer to synthesize the conductive polymer can include thiophene or its derivative, pyrrole or its derivative, and aniline or its derivative. Among then, thiophene or its derivative can be preferably used. In particular, one adding pyrrole or its derivative into thiophene or its derivative is preferable.

Regarding thiophene or its derivative, the examples of the derivative of thiophene can include 3,4-ethylenedioxythiophene, 3-alkylthiophene, 3-alkoxythiophene, 3-alkyl-4-alkoxythiophene, 3,4-alkylthiophene and 3,4-alkoxythiophene, and alkylated ethylenedioxythiophene which has modified 3,4-ethylenedioxythiophene with an alkyl group. The carbon number of the alkyl group and the alkoxy group can be preferably 1 to 16, and in particular, 1 to 4.

Further explanation is made for the alkylated ethylenedioxythiophene ethylenedioxythiophene in which 3,4-ethylenedioxythiophene ethylenedioxythiophene is modified with an alkyl group. 3,4-ethylenedioxythiophene ethylenedioxythiophene and the alkylated ethylenedioxythiophene ethylenedioxythiophene as mentioned above correspond to a compound represented by the following formula (1).

[Formula 1]

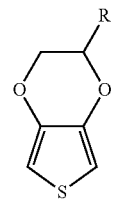

(1)

In the formula, R is hydrogen or an alkyl group.

In the formula (1) mentioned above, when R is hydrogen, it is 3,4-ethylenedioxythiophene. When it is expressed by the IUPAC name, it is 2,3-dihydro-thieno [3,4-b][1,4] dioxine. However, rather than the IUPAC name, this compound is often expressed by its common name, "3,4-ethylenedioxythiophene," or further by omitting the term "3,4-," it can be expressed by "ethylenedioxythiophene." Therefore, this specification names it as "3,4-ethylenedioxythiophene" or "ethylenedioxythiophene" rather than "2,3-dihydro-thieno [3,4-b][1,4] dioxine." Also, when R in the formula (1) is an alkyl group, the alkyl group is preferably one with a carbon number of 1-4, that is, methyl group, ethyl group, propyl group, butyl group. Specifically, when R in formula (1) is methyl group, such a compound is expressed as 2-methyl-2,3-dihydro-thieno [3, 4-b][1,4] dioxine under the IUPAC name, which is hereinafter simply referred to as "methylated ethylenedioxythiophene." When R in formula (1) is ethyl group, such a compound is 2-ethyl-2,3-dihydro-thieno [3,4-b][1,4] dioxine)" under the IUPAC name. Hereinafter, this compound is simply referred to as "ethylated ethylenedioxythiophene." When R in formula (1) is propyl group, such a compound is 2-propyl-2,3-dihydro-thieno [3,4-b][1,4] dioxine under the IUPAC name. Hereinafter, this compound is simply referred to as "propylated ethylenedioxythiophene." Also, when R in formula (1) is butyl group, such a compound is 2-butyl-2,3-dihydro-thieno [3,4-b][1,4] dioxine under the IUPAC name. Hereinafter, this compound is simply referred to as "butylated ethylenedioxythiophene." In addition, "2-alkyl-2,3-dihydro-thieno [3,4-b][1, 4] dioxine" is simply referred to as "alkylated ethylenedioxythiophene." Here, among the alkylated ethylenedioxythiophenes, particularly preferable are methylated ethylenedioxythiophene, ethylated ethylenedioxythiophene, propylated ethylenedioxythiophene, and butylated ethylenedioxythiophene.

These alkylated ethylenedioxythiophenes can be used alone or in combination of two or more. Furthermore, these alkylated ethylenedioxythiophenes can be used together with ethylenedioxythiophene (i.e., 3,4-ethylenedioxythiophene). In addition, the synthesis methods of methylated ethylenedioxythiophene, ethylated ethylenedioxythiophene, propylated ethylenedioxythiophene and butylated ethylenedioxythiophene are disclosed in International Patent Publication No. 2011/068026 and International Patent Publication No. 2011/074380, filed by the applicant of the present application.

Regarding the derivative in the meaning of the pyrrole and its derivative, the examples thereof can include 3-methylpyrrole, 3-ethylpyrrole, 3-propylpyrrole, 3-butylpyrrole, 3-pentylpyrrole, 3-hexylpyrrole, and 3,4-ethylenedioxypyrrole.

In the present invention, as a monomer, pyrrole or its derivative (which may be hereinafter referred to as a "pyrrole type monomer") can be added into thiophene or it derivative (which may be hereinafter referred to as a "thiophene type monomer"), which can be used as a mixture of the thiophene type monomer and pyrrole type monomer. Doing so can improve the reaction rate at the time of the polymerization. Thereby, it is preferable that an ESR of an electrolyte capacitor can be further decreased.

In mixing the thiophene type monomer with the pyrrole type monomer, the quantity of the pyrrole type monomer with respect to the thiophene type monomer can be as follow. The pyrrole type monomer can be added at 1 to 100% by mass with respect to the thiophene type monomer (namely, the pyrrole type monomer can be added at 1 to 100 parts by mass with respect to 100 parts by mass of the thiophene type monomer). It can be preferably at 5 to 50%, and in particularly, it can be 10 to 30%. That the pyrrole type monomer is added at 1 to 100% by mass with respect to the thiophene type monomer means that the pyrrole type monomer is added at 1 to 100% by mass with respect to the thiophene type monomer in the mixture of the thiophene type monomer and the pyrrole type monomer. If the quantity of the pyrrole type monomer exceeds the range above, the characteristic of the thiophene type monomer can be deteriorated, while the thiophene type monomer has a property which tends to produce an electrolyte capacitor that has a low ESR and is superior in the heat resistance. Rather, if that is the case, it is possible that the ESR of an electrolyte capacitor might be increased and the heat resistance might be deteriorated.

The monomer liquid for conductive polymer production of the present invention can be prepared as follows. Into a monomer, at least one kind selected from the group consisting of a naphthalene sulfonic acid type heterocyclic compound and a benzene sulfonic acid type heterocyclic compound in which no hydroxyl group is directly connected to the benzene ring. Such a dispersion liquid looks almost transparent by naked eyes. Therefore, it is considered that a part of the naphthalene sulfonic acid type heterocyclic compound and the benzene sulfonic acid type heterocyclic compound dissolves in the monomer. In addition, the dispersion state is quite excellent, and therefore, it does not make precipitations even after leaving it at a condition of 20° C. for six months, as shown in the Examples discussed later.

In the preparation of the monomer liquid for conductive polymer production of the present invention, preferable is a mass ratio of 1:0.1 to 0.1:1 regarding a monomer to at least one kind selected from the group consisting of a naphthalene sulfonic acid type heterocyclic compound and a benzene sulfonic acid type heterocyclic compound in which no hydroxyl group is directly connected to the benzene ring. Moreover, it can be 1:0.3 to 0.3:1 and more particular, it can be 1:0.5 to 0.5:1.

When the ratio of said at least one kind selected from the group consisting of naphthalene monosulfonic acid type heterocyclic compound and benzene sulfonic acid type heterocyclic compound with respect to the monomer is lower than the range above, it results in few amounts of the dopant components. In this case, it can be difficult to obtain desirable conductive polymer having a high conductivity. By contrast, when the ratio of said at least one kind selected from the group consisting of naphthalene monosulfonic acid type heterocyclic compound and benzene sulfonic acid type heterocyclic compound with respect to the monomer is higher than the range above, it results in fewer amounts of the monomer components. In this case, the amounts of the conductive polymer to be obtained can be decreased.

In the present invention, the naphthalene sulfonic acid type heterocyclic compound and the benzene sulfonic acid type heterocyclic compound themselves have a dispersibility into the monomer, and therefore, they can be made into a dispersion liquid without an organic solvent. Therefore, the monomer liquid for conductive polymer production of the present invention can be composed of only a monomer and at least one kind selected from the group consisting of naphthalene monosulfonic acid type heterocyclic compound and benzene sulfonic acid type heterocyclic compound. However, when using the monomer liquid for this conductive polymer production in the production of an electrolyte capacitor, an alcohol having a carbon number of 1 to 4, such as methanol, ethanol, propanol and butanol can be preferably added into the monomer liquid for conductive polymer production, so as to dilute monomer liquid for conductive polymer production with the alcohol to improve the handling property. Also, in order to make a condition including such an alcohol, said at least one kind selected from the group consisting of naphthalene monosulfonic acid type heterocyclic compound and naphthalene trisulfonic acid type heterocyclic compound is dispersed into a monomer in the presence of alcohol. Thereby, a monomer liquid for conductive polymer production including an alcohol having a carbon number of 1 to 4.

In the preparation of the monomer liquid for conductive polymer production of the present invention, a compound having a glycidyl group (i.e., epoxy group) or its ring-opening compound, or a silane compound can be added. Thereby, the electrolyte capacitor can be further improved by reducing the leak current, and therefore, the outbreak of the short defectiveness can be reduced.

The suitable examples of the compound having a glycidyl group can include monoglycidyl compound, diglycidyl compound, glycerintriglycidylether, diglycerinetetraglycidylether, alcohol-soluble epoxy resin, alcohol-soluble polyglycerin polyglycidyl and their ring-opening compounds. In case of the ring-opening compound of a glycidyl compound having two or more glycidyl groups, all the glycidyl groups do not necessarily ring-opened, but it is possible that only a part thereof can be ring-opened.

The suitable examples of the silane compound can include unsaturated hydrocarbon containing alkoxysilane compound or its hydrolysate, glycidyl group containing alkoxy silane compound or its hydrolysate, silane denaturation resin, and polysiloxane.

The specific examples of the compound having a glycidyl group as mentioned above can include e.g., epoxy propanol (i.e., glycidol), methyl glycidyl ether, ethyl glycidyl ether, propyl glycidyl ether, butyl glycidyl ether, epoxybutane (i.e., glycidyl methane), epoxypentane (i.e., glycidyl ethane), epoxyhexane (i.e., glycidyl propane), epoxyheptane (i.e., glycidyl butane), epoxyoctane (i.e., glycidyl pentane), glycidoxypropyltrimethoxysilane, glycidoxypropylmethyldimethoxysilane, glycidoxypropyltriethoxysilane, glycidoxypropylmethyldiethoxysilane, glycidyl methacrylate, 2-(3,4-epoxycyclohexyl)ethyltrimethoxysilane, 3-glycidoxypropylmethyldimethoxysilane, 3-glycidoxypropyltrimethoxysilane, 3-glycidoxypropyltriethoxysilane, ethylene glycol diglycidyl ether, propylene glycol diglycidyl ether, butylene glycol diglycidyl ether, pentylene glycol diglycidyl ether, hexylene glycol diglycidyl ether, glycerol diglycidyl ether, diethylene glycol diglycidyl ether, dipropylene glycol diglycidyl ether, triethylene glycol diglycidyl ether, tripropylene glycol diglycidyl ether, polyethylene glycol diglycidyl ether, and polypropylene glycol diglycidyl ether.

As the alcohol-soluble epoxy resin, for example, a commercially available product, "WATER SOL BC-3010" from DIC Corporation, can be suitably used. As the alcohol-soluble polyglycerin polyglycidyl, for example, a commercially available product, "SR-4GLS" from Sakamoto Yakuhin Kogyo Co., Ltd. can be suitably used.

The ring-opening compound of the compound having the glycidyl group mentioned above is a glycol in which the glycidyl group included in the compound has been ring-opened, as represented by the following formula.

[Formula 2]

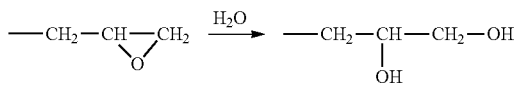

The compound having a glycidyl group can be used alone or in combination of two or more.

The silane compound as mentioned above can include, e.g., 3-methacryloxypropyltrimethoxysilane, 3-methacryloxypropylmethyldimethoxysilane, 3-methacryloxypropyldimethylmethoxysilane, 3-methacryloxypropyldimethylethoxysilane, 3-methacryloxypropyltriethoxysilane, 3-acryloxypropyltrimethoxysilane, 3-acryloxymethyldimethoxysilane, 3-acryloxymethyldiethoxysilane, 3-acryloxytriethoxysilane, p-styryltrimethoxysilane, p-styryltriethoxysilane, p-styrylmethyldimethoxysilane, vinyltrimethoxysilane, vinyltriethoxysilane, vinylmethyldimethoxysilane, vinyldimethylmethoxysilane, 2-(3,4-epoxycyclohexyl)ethyltrimethoxysilane, 3-glycidoxypropylmethyldimethoxysilane, 3-glycidoxypropyltrimethoxysilane, 3-glycidoxypropylmethyldiethoxysilane, 3-glycidoxypropyltriethoxysilane, poly(oxyethylene oxypropylene)methylpolysiloxane copolymer, and polysiloxane.

The silane compound can be used alone or in combination of two or more thereof.

The compound having a glycidyl group or its ring-opening compound, or the silane compound is added to said at least one kind selected from the group consisting of a naphthalene sulfonic acid type heterocyclic compound and a benzene sulfonic acid type heterocyclic compound in which no hydroxyl group (which may be hereinafter simplified as "organic sulfonic acid heterocyclic compound") at a content as follow. Namely, the content can be preferably 5 to 500% (i.e., the compound having a glycidyl group is added at 5 to 500 parts by mass with respect to 100 parts by mass of the organic sulfonic acid heterocyclic compound). When the content of the compound having a glycidyl group or its ring-opening compound, or the silane compound is lower than the range above, the function to reduce the leak current is not exhibited enough. By contrast, when the content of the compound having a glycidyl group or its ring-opening compound, or the silane compound is more than the range above, the effects obtained by increasing the content are expected little, but the costs might be raised while the reaction rate might be decreased. Also, the compound having a glycidyl group or its ring-opening compound, or the silane compound can be added to the organic sulfonic acid heterocyclic compound at a content as follows: Namely, within the range discussed above, it can be added at a content of 10 mass % or more, and 100 mass % or less with respect to the organic sulfonic acid heterocyclic compound.

When the compound having a glycidyl group or its ring-opening compound, or the silane compound is added to the monomer liquid for conductive polymer production, not only the leak current can be reduced due to the addition of the compound having a glycidyl group or its ring-opening compound, or the silane compound, but also the effect to suppress the outbreak of the short defectiveness can be expected to be improved more.

Then, the production of an electrolyte capacitor by using the monomer liquid for conductive polymer production is explained.

First, the capacitor element is explained. Suppose the monomer liquid for conductive polymer production of the present invention is used to prepare a non-winding-type electrolyte capacitor such as tantalum electrolyte capacitor, niobium electrolyte capacitor, and laminated-type or plain-type aluminum electrolyte capacitor. Here, a capacitor element is provided which includes a porous body of a valve metal such as tantalum, niobium and aluminum, which becomes a positive electrode, and a dielectric layer made of an oxide layer of the valve metal. Also, suppose that the monomer liquid for conductive polymer production of the present invention is used to prepare a winding-type electrolyte capacitor. Here, a capacitor element provided is a valve metal such as aluminum foil, whose surface is applied to an etching treatment, followed by carrying out a chemical conversion treatment to form a dielectric layer of an oxide layer of the valve metal as mentioned above, thereby obtaining a positive electrode, to which a lead terminal is attached. Also, a lead terminal is attached to a negative electrode of a valve metal foil such as aluminum foil. The positive electrode and the negative electrode, each having the lead terminal, were wound with an intervention of a separator.

Then, in the production of the electrolyte capacitor, the capacitor element is impregnated with the monomer liquid for conductive polymer production of the present invention. The process of impregnation can be performed by e.g., immersing the capacitor element into the monomer liquid for conductive polymer production, or spraying or coating the monomer liquid for conductive polymer production onto the capacitor element.

In this process, the monomer liquid for conductive polymer production can be preferably provided in a state where it has been diluted with an alcohol having a carbon number of 1 to 4, as explained before. The content of the alcohol is not particularly limited, but it can be determined depending on the handling property such as the viscosity of the monomer liquid for conductive polymer production. Usually, it can be preferably added to result in 20 to 85 mass % of the total content of the monomer in the monomer liquid for conductive polymer production, and said at least one kind selected from the group consisting of naphthalene sulfonic acid type heterocyclic compound and benzene sulfonic acid type heterocyclic compound. Furthermore, it can be more preferably added to result in 30 to 80 mass % thereof.

After the capacitor element is impregnated with the monomer liquid for conductive polymer production of the present invention and dried, the capacitor element is impregnated with an oxidant solution. When the process of the impregnation of the capacitor element with the monomer liquid for conductive polymer production is carried out by immersing the capacitor element in the monomer liquid for conductive polymer production, the following steps are carried out. Namely, the capacitor element is taken out from the monomer liquid for conductive polymer production (taking out step), and then, it is dried, and then, the capacitor element is impregnated with the oxidant solution.

The examples of the oxidant can include, for example, persulfates such as ammonium persulfate, sodium persulfate, potassium persulfate, calcium persulfate, and barium persulfate. In particular, ammonium persulfate is preferable. In making the persulfate a solution, water is usually used. The concentration of the persulfate in the solution is not particularly limited, but 30 to 50 mass % is generally preferable.

Also, after impregnation of the capacitor element with the monomer liquid for conductive polymer production, the impregnation with the oxidant can be performed by e.g., immersing the capacitor element into the oxidant solution, or spraying the oxidant solution onto the capacitor element. Then, after impregnation with the oxidant solution, the monomer is polymerized at room temperature (25° C.) or under heating to obtain a conductive polymer. If the impregnation is accomplished by immersing the capacitor element into the oxidant solution, the capacitor element is then taken out from the oxidant solution (i.e., after taking it out), and the monomer is polymerized at room temperature or under heating. When the polymerization of the monomer is carried out at room temperature, it is preferable to polymerize it at 25° C. for 60 to 120 minutes. When the polymerization of the monomer is carried out under heating, it is preferable to polymerize it by heating it at e.g., 30 to 85° C. for 30 to 60 minutes. If adding a very small amount of iron into the oxidant solution, the polymerization rate of the monomer can be accelerated. However, it is noted that iron may cause an increase of the leak current of the electrolyte capacitor. Therefore, it is necessary to put it therein at a range which does not cause the leak current. Thus, the content is required to be 5,000 ppm or less. In particular, it is preferably 100 to 5000 ppm. Moreover, it is more preferably 300 to 1500 ppm.

Then, at least one sequential process is carried out including impregnating the capacitor element monomer with the monomer liquid for conductive polymer production of the present invention, followed by impregnation with the oxidant solution, and polymerization of the monomer. In other words, this sequential process can be repeated as necessary. Thereby, a solid electrolyte layer made of a conductive polymer can be formed on the capacitor element. As a result, the solid electrolyte layer made of a conductive polymer can be provided on a dielectric layer made of a valve metal oxide layer which is formed on the surface of the valve metal to become a positive electrode in the capacitor element. However, the conductive polymer may be attached to other parts of the capacitor element.

It is possible that using the monomer liquid for conductive polymer production of the present invention, the solid electrolyte layer made of the conductive polymer can be formed by so-called "on-site polymerization," followed by coating the solid electrolyte layer with carbon paste and silver paste to be finished to obtain an electrolyte capacitor. Alternatively, it is possible that on the solid electrolyte layer made of the conductive polymer by using the monomer liquid for conductive polymer production of the present invention, another one layer or two or more layers of the solid electrolyte layer consisting of a conductive polymer can be formed by using a conductive polymer dispersion liquid, so as to be finished to obtain an electrolyte capacitor. Doing so, the time of the manufacturing process of the electrolyte capacitor can be shortened while improving the heat resistance and the humidity resistance. Furthermore, before forming the solid electrolyte layer made of the conductive polymer by using the monomer liquid for conductive polymer production of the present invention, a solid electrolyte layer made of a conductive polymer by using a conductive polymer dispersion liquid can be formed.

Regarding the impregnation of the capacitor element with the monomer liquid for conductive polymer production of the present invention, it is noted as follows. For example, a capacitor element is immersed into a monomer or a monomer solution (i.e., a monomer solution in which the monomer is diluted with an alcohol) in which said at least one kind selected from the group consisting of naphthalene sulfonic acid type heterocyclic compound and benzene sulfonic acid type heterocyclic compound is not dispersed. Then, the capacitor element is taken out from the monomer or a monomer solution. In this case, then, after the capacitor element is immersed into a dispersion liquid which disperses said at least one kind selected from the group consisting of naphthalene sulfonic acid type heterocyclic compound and benzene sulfonic acid type heterocyclic compound, the following feature is found. Namely, inside the capacitor element or on the capacitor element, the monomer and said at least one kind selected from the group consisting of naphthalene sulfonic acid type heterocyclic compound and benzene sulfonic acid type heterocyclic compound can make the same structure as the monomer liquid for conductive polymer production of the present invention. Therefore, this case can be included within the present invention.

In addition, even if the order of the impregnation of capacitor elements with the liquid as mentioned above is reverse (namely, this is the case where the capacitor element is first impregnated into a dispersion liquid of said at least one kind selected from the group consisting of naphthalene sulfonic acid type heterocyclic compound and benezene sulfonic acid type heterocyclic compound, and then, the capacitor element is impregnated with the monomer or the monomer solution), inside the capacitor element or on the capacitor element, the monomer and said at least one kind selected from the group consisting of naphthalene sulfonic acid type heterocyclic compound and benezene sulfonic acid type heterocyclic compound can make a dispersion liquid. Therefore, such a case is within the present invention.

Furthermore, when the capacitor element is immersed in a monomer solution and then taken out from the monomer solution and then dried, the monomer in itself is still liquid. Then, the liquid monomer is impregnated in the capacitor element, then the capacitor element is immersed in a dispersion liquid including said at least one kind selected from the group consisting of naphthalene sulfonic acid type heterocyclic compound and benzene sulfonic acid type heterocyclic compound. In this case, inside the capacitor element or on the capacitor element, the monomer and said at least one kind selected from the group consisting of naphthalene sulfonic acid type heterocyclic compound and benzene sulfonic acid type heterocyclic compound can make a dispersion liquid. This is the same structure as the monomer liquid for conductive polymer production of the present invention. Therefore, this case is included within the present invention. Also, instead of the monomer solution, the capacitor element can be immersed in a monomer. Since the monomer itself is liquid, a liquid state can be maintained even if it is dried. Therefore, it becomes a similar state where the capacitor element is immersed in a monomer solution. Therefore, this case can be included within the present invention.

Furthermore, suppose the case where the capacitor element is immersed into a dispersion liquid of said at least one kind selected from the group consisting of naphthalene sulfonic acid type heterocyclic compound and benzene sulfonic acid type heterocyclic compound, and then, taken out therefrom, it is dried. In this case, suppose further that said at least one kind selected from the group consisting of naphthalene sulfonic acid type heterocyclic compound and benzene sulfonic acid type heterocyclic compound becomes a solid state. Even though, when the capacitor element is then immersed in a monomer solution, said at least one kind chosen among the group consisting of a naphthalene sulfonic acid type heterocyclic compound and a benzene sulfonic acid type heterocyclic compound, once it is at a solid state, can be dispersed in the monomer solution. Therefore, in this case, inside the capacitor element or on the capacitor element, the monomer and said at least one kind selected from the group consisting of naphthalene sulfonic acid type heterocyclic compound and benzene sulfonic acid type heterocyclic compound can make a dispersion liquid. Therefore, this case can be included within the present invention. Also, inside the capacitor element or on the capacitor element, suppose a solid state by drying said at least one kind selected from the group consisting of a naphthalene sulfonic acid type heterocyclic compound and a benzene sulfonic acid type heterocyclic compound is held on the capacitor element. Suppose further that this capacitor element is not immersed in a monomer solution as described above, but immersed in a monomer. Even though, said at least one kind selected from the group consisting of the naphthalene sulfonic acid type heterocyclic compound and the benzene sulfonic acid type heterocyclic compound, once it is in a solid state, can be dispersed in the monomer being liquid. In this case, inside the capacitor element or on the capacitor element, like the monomer liquid for conductive polymer production of the present invention, the monomer and said at least one kind selected from the group consisting of the naphthalene sulfonic acid type heterocyclic compound and the benezene sulfonic acid type heterocyclic compound dispersed in the monomer can make the monomer liquid for conductive polymer production will be constructed. Therefore, this case can be included within the present invention.

The explanation above is explained by using the embodiments in case of immersing a capacitor element into a monomer, a monomer solution, and a dispersion liquid of said at least one kind selected from the group consisting of the naphthalene sulfonic acid type heterocyclic compound and the benezene sulfonic acid type heterocyclic compound. In addition, the embodiment where for example, these liquids are sprayed on the capacitor element such that the capacitor element is impregnated with these solutions should be included in the present invention in the same manner as described above.

In the preparation of a conductive polymer dispersion liquid as mentioned above, known kinds of dopant can be used to synthesize the conductive polymer. In particular, preferable are polystyrene sulfonic acid, sulfonated polyester, phenolsulfonic acid novolac resin, and macromolecule sulfonic acid polymer anion (high polymer sulfonic acid type dopant) made by copolymerizing styrenesulfonic acid and a non-sulfonic acid monomer selected from the group of methacrylate, acrylate and unsaturated hydrocarbon containing alkoxysilane compound, and hydrolysate thereof.

Regarding the polystyrene sulfonate above, its weight average molecular weight can be preferably 10,000 to 1,000,000.

Namely, when the weight average molecular weight of the polystyrene sulfonic acid above is smaller than 10,000, thereby obtained conductive polymer might have a low conductivity. By contrast, when the weight average molecular weight of the polystyrene sulfonate above is larger than 1,000,000, the viscosity of the dispersion liquid of the conductive polymer becomes high, and therefore, it might be difficult to handle it in the production of an electrolyte capacitor. Furthermore, within the range of the weight average molecular weight of the polystyrene sulfonic acid mentioned above, it is preferably 20,000 or more, and more preferably 40,000 or more, and also, it is preferably 800,000 or less, and more preferably 300,000 or less.

The sulfonated polyester above can be obtained by condensation polymerization from dicarboxy benzenesulfonic acid diester such as sulfoisophthalate and sulfoterephthalate, and alkylene glycol in the presence of a catalyst such as antimony oxide or zinc oxide. The weight average molecular weight of the sulfonated polyesters can be preferably 5,000 to 300,000.

Namely, when the weight average molecular weight of the sulfonated polyester is lower than 5,000, thereby obtained conductive polymer might have a low conductivity. Also, when the weight average molecular weight of the sulfonated polyester above is larger than 300,000, the viscosity of the dispersion liquid of the conductive polymer becomes high, and therefore, it might be difficult to handle it in the production of an electrolyte capacitor. Furthermore, within the range of the weight average molecular weight of the sulfonated polyester above, it is preferably 10,000 or more, and more preferably 20,000 or more, and also, it is preferably 100,000 or less, and more preferably 80,000 or less.

The phenolsulfonic acid novolac resin as mentioned above can preferably include the repeating unit represented by formula (2).

[Formula 3]

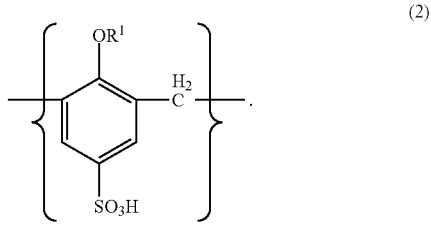

(2)

(In the formula, R1 is hydrogen or methyl group.)

The weight average molecular weight of the phenolsulfonic acid novolac resin can be preferably 5,000 to 500,000.

Namely, when the weight average molecular weight of the phenolsulfonic acid novolac resin above is smaller than 5,000, thereby obtained conductive polymer might be low in the conductivity. By contrast, when the weight average molecular weight of the phenolsulfonic acid novolac resin above is larger than 500,000, the viscosity of the dispersion liquid of the conductive polymer becomes high, and therefore, it might be difficult to handle it in the production of an electrolyte capacitor. Furthermore, within the range of the weight average molecular weight of the phenolsulfonic acid novolac resin above, it is preferably 10,000 or more, and also, it is preferably 400,000 or less, and more preferably 80,000 or less.

The polymer anion such as polystyrene sulfonic acid, sulfonated polyester, and phenolsulfonic acid novolac resin as mentioned above can be used alone or in combination of two kinds or more.

A copolymer made from styrenesulfonic acid, and at least one kind of a non-sulfonic acid monomer selected from the group of methacrylate, acrylate, and unsaturated hydrocarbon containing alkoxysilane compound or a hydrolysate thereof (which is hereinafter referred to as "copolymer of styrenesulfonic acid and non-sulfonic acid monomer") is used as a dopant. Thereby obtained conductive polymer of thiophene or its derivative obtained by oxidation polymerization has high conductivity and superior heat resistance. Therefore, it is suitable to manufacture an electrolyte capacitor which is low in ESR, reliable under a hot condition, and causes less leakage current.

Explained here is the polymerization of the copolymer from styrenesulfonic acid, and at least one kind of a non-sulfonic acid monomer selected from the group of methacrylate, acrylate, and unsaturated hydrocarbon containing alkoxysilane compound or a hydrolysate thereof. As the monomer to be copolymerized with styrenesulfonic acid, used is at least one kind of a non-sulfonic acid monomer selected from the group of methacrylate, acrylate, and unsaturated hydrocarbon containing alkoxysilane compound or a hydrolysate thereof. The examples of the methacrylate as mentioned above can include methyl methacrylate, ethyl methacrylate, propyl methacrylate, butyl methacrylate, hexyl methacrylate, stearyl methacrylate, cyclohexyl methacrylate, diphenylbutyl methacrylate, dimethylaminoethyl methacrylate, diethylaminoethyl methacrylate, sodium sulfohexyl methacrylate, glycidyl methacrylate, methylglycidyl methacrylate, hydroxyalkyl methacrylate, (namely, hydroxyalkyl methacrylate such as hydroxymethyl methacrylate, hydroxyethyl methacrylate, hydroxypropyl methacrylate, hydroxybutyl methacrylate, hydroxyhexyl methacrylate, hydroxystearyl methacrylate), hydroxypolyoxyethylene methacrylate, methoxyhydroxypropyl methacrylate, ethoxyhydroxypropyl methacrylate, dihydroxypropyl methacrylate, and dihydroxybutyl methacrylate. In particular, preferable are hydroxyalkyl methacrylate such as hydroxymethyl methacrylate, hydroxyethyl methacrylate, hydroxypropyl methacrylate and hydroxybutyl methacrylate. The carbon number of these compounds is 1 to 4. It is preferable to exhibit a characteristic serving as a dopant when it is copolymerized with styrenesulfonic acid. Also, the compounds such as glycidyl methacrylate and methylglycidyl methacrylate include glycidyl group. These compounds have a structure having hydroxyl group when opening the glycidyl group. Therefore, in the same reasons as the hydroxyalkyl methacrylate, a compound having a glycidyl group is also preferable in view of the characteristic serving as a dopant when it is copolymerised with styrenesulfonic acid.

The examples of the acrylate as mentioned above can include methyl acrylate, ethyl acrylate, propyl acrylate, butyl acrylate, hexyl acrylate, stearyl acrylate, cyclohexyl acrylate, diphenylbutyl acrylate, dimethylaminoethyl acrylate, diethylaminoethyl acrylate, sodium sulfohexyl acrylate, glycidyl acrylate, methylglycidyl acrylate, hydroxyalkyl acrylate, (namely, hydroxyalkyl acrylate such as hydroxymethyl acrylate, hydroxyethyl acrylate, hydroxypropyl acrylate, and hydroxybutyl acrylate). In particular, preferable are hydroxymethyl acrylate, hydroxyethyl acrylate, hydroxypropyl acrylate and hydroxybutyl acrylate. The carbon number of these compounds is 1 to 4. These compounds are preferable in view of the characteristic serving as a dopant when it is copolymerized with styrenesulfonic acid. Also, the compounds such as glycidyl acrylate and methylglycidyl acrylate include glycidyl group. These compounds have a structure having hydroxyl group when opening the glycidyl group. Therefore, in the same reasons as the hydroxyalkyl acrylate, a compound having a glycidyl group is also preferable in view of the characteristic serving as a dopant when it is copolymerised with styrenesulfonic acid.

As the unsaturated hydrocarbon containing alkoxysilane compound or its hydrolysate as mentioned above, the followings can be exemplified. That is, the examples thereof can include an unsaturated hydrocarbon containing alkoxysilane compound and its hydrolysate such as 3-methacryloxypropyltrimethoxysilane, 3-methacryloxypropylmethyldimethoxysilane, 3-methacryloxypropyldimethylmethoxysilane, 3-methacryloxypropyldimethylethoxysilane, 3-methacryloxypropyltriethoxysilane, 3-acryloxypropyltrimethoxysilane, 3-acryloxymethyldimethoxysilane, 3-acryloxymethyldiethoxysilane, 3-acryloxytriethoxysilane, p-styryltrimethoxysilane, p-styryltriethoxysilane, p-styrylmethyldimethoxysilane, vinyltrimethoxysilane, vinyltriethoxysilane, vinylmethyldimethoxysilane, and vinyldimethylmethoxysilane. The hydrolysate of such an unsaturated hydrocarbon containing alkoxysilane compound can be as follows. For example, if the unsaturated hydrocarbon containing alkoxysilane compound is 3-methacryloxypropyltrimethoxysilane as mentioned above, it can be a compound having a structure in which its methoxy group is hydrolyzed to become hydroxyl group (i.e., 3-methacryloxypropyltrihydroxysilane), or a compound having a structure in which silane groups are condensed each other to form an oligomer while its methoxy group that has not been involved in the reaction becomes hydroxyl group. Also, as the unsaturated hydrocarbon containing alkoxysilane compound, favorable are 3-methacryloxypropyltrimethoxysilane, 3-acryloxypropyltrimethoxysilane, p-styryltrimethoxysilane, vinyltrimethoxysilane in view of serving as a dopant when copolymerized with styrenesulfonic acid.

Here, the following feature can be provided in the copolymer made from styrenesulfonic acid, and at least one kind of a non-sulfonic acid monomer selected from the group consisting of methacrylate, acrylate, and unsaturated hydrocarbon containing alkoxysilane compound or hydrolysate thereof. A mass ratio of 1:0.01 to 0.1:1 is preferable for the styrenesulfonic acid, to said at least one kind of the non-sulfonic acid monomer selected from the group of methacrylate, acrylate, and unsaturated hydrocarbon containing alkoxysilane compound or hydrolysate thereof.

Also, the following feature is found in the copolymer made from styrenesulfonic acid, and at least one kind of a non-sulfonic acid monomer selected from the group of methacrylate, acrylate, and unsaturated hydrocarbon containing alkoxysilane compound or its hydrolysate. Regarding the molecular weight, it has a weight average molecular weight of about 5,000 to 500,000 in view of the characteristics of water-solubility and dopant. In particular, it preferably has a weight average molecular weight of about 40,000 to 200,000.

The copolymer of styrenesulfonic acid and the non-sulfonic acid monomer above can be used together with a polymeric sulfonic acid such as polystyrene sulfonic acid, sulfonated polyester, and phenolsulfonic acid novolac resin, as mentioned above. Also, in use, a dispersion liquid of a conductive polymer synthesized by using the copolymer from styrenesulfonic acid and the non-sulfonic acid monomer as a dopant can be mixed with another dispersion liquid of a conductive polymer synthesized by using the polymeric sulfonic acid as a dopant.

Next, explained is the means to polymerize a conductive polymer by means of oxidation polymerization of a monomer with a polymer anion as dopant (here, the most typical monomer, that is, thiophene or its derivative is exemplified). Listed here is polystyrene sulfonic acid, sulfonated polyester, phenolsulfonic acid novolac resin, and a copolymer of styrenesulfonic acid and a non-sulfonic acid monomer (i.e., a compolymer from styrenesulfonic acid and a non-sulfonic acid monomer selected from the group consisting of methacrylate, acrylate and an unsaturated hydrocarbon containing alkoxysilane compound, and hydrolyzate thereof). All of the lists above have solubility to water, or an aqueous solution of a mixture of water and a water-miscible solvent. Thus, the oxidation polymerization is performed in water or an aqueous solution.

As the water-miscible solvent constituting the aqueous solution mentioned above, the example can include methanol, ethanol, propanol, acetone, and acetonitrile. The mixing ratio of the water-miscible solvent with respect to water can be preferably 50% by mass or less.

The oxidation polymerization for preparing the conductive polymer can be either through chemical oxidation polymerization or electrolytic oxidation polymerization.

To perform the chemical oxidation polymerization, a persulfate can be used as an oxidant, for example. The example of the persulfates can include ammonium persulfate, sodium persulfate, potassium persulfate, calcium persulfate, and barium persulfate.

Regarding the chemical oxidation polymerization, the condition during the polymerization is not particularly limited. The temperature in the chemical oxidation polymerization can be preferably 5° C. to 95° C., and in more particular, it can be 10° C. to 30° C. The polymerization period can be preferably one hour to 72 hours, and in more particular, it can be 8 hours to 24 hours.

The electrolytic oxidation polymerization can be carried out either in constant current or constant voltage. For example, when the electrolytic oxidation polymerization is performed in constant current, its current value can be preferably 0.05 mA/cm$^2$ to 10 mA/cm$^2$, and in particular, it can be 0.2 mA/cm$^2$ to 4 mA/cm$^2$. When the electrolytic oxidation polymerization is performed in constant voltage, its voltage can be preferably 0.5V to 10 V, and in more particular, it can be 1.5V to 5V. The temperature in the electrolytic oxidation polymerization can be preferably 5° C. to 95° C., and in more particular, it can be 10° C. to 30° C. The polymerization period can be preferably one hour to 72 hours, and in more particular, it can be 8 hours to 24 hours. In addition, upon the electrolytic oxidation polymerization, ferrous sulfate or ferric sulfate can be added as a catalyst.

Just after the polymerization as prepared above, the conductive polymer can be obtained as a dispersion state in water or the aqueous solution, which includes a persulfate used as an oxidant, or an iron sulfate or its decomposition product used as a catalyst. Therefore, the dispersion liquid of the conductive polymer including the impurities can be applied to a dispersion machine such as a ultrasonic homogenizer, high-pressure homogenizer or planetary ball mill to disperse the impurities. Then, the metal components are favorably removed with a cation-exchange resin. At this time, the particle size of the conductive polymer measured by means of dynamic light scattering can be preferably 100 μm or less, and in particular 10 μm or less. Also, it is preferably 0.01 μm or more, and in particular 0.1 μm or more. Then, a process such as ethanol precipitation process, ultrafiltration process and anion exchange resin process can be applied to remove the compounds generated by decomposition of the oxidant and the catalyst. As described later, if necessary, a conductive improver and a binder can be added.

A conductive improver as described above can be added into the conductive polymer dispersion liquid thus prepared. In this way, when such a conductive improver is added into the conductive polymer dispersion liquid, the conductivity of a conductive polymer film made by drying the conductive polymer dispersion liquid can be improved. Thereby, when preparing an electrolyte capacitor by using the conductive polymer as an electrolyte, its ESR can be lowered.

Here, the reason is considered as follows. When preparing the solid electrolyte capacitor, a capacitor element is immersed in the dispersion liquid of the conductive polymer, and then, it is taken out and dried. At this time, the layer density in the thickness direction of the conductive polymer can be increased. Thereby, a space between the conductive polymers becomes narrow. As a result, a conductivity of the conductive polymer becomes high. Therefore, when such a conductive polymer is used as an electrolyte of an electrolyte capacitor, it is considered that the ESR of the electrolyte capacitor can be lowered.

The examples of the conductive improver can include: organic solvents with a high boiling point (e.g., a high boiling point of 150° C. or more) such as dimethylsulfoxide, gamma-butyrolactone, sulfolane, N-methylpyrrolidone, dimethylsulfone, ethylene glycol, diethylene glycol and polyethylene glycol; and saccharides such as erythritol, glucose, mannose and pullulan. In particular, dimethylsulfoxide and butanediol are preferable.

The conductive improver can be added at an amount as shown below. It is preferable to add 5 to 3,000% by mass standard with respect to the conductive polymer in the dispersion liquid (namely, the conductive improver is added at 5-3,000 parts by mass with respect to 100 parts by mass of the conductive polymer). In particular, it can be added at 20 to 700%. When the conductive improver is added at an amount less than the range above, the effects to improve the conductivity might not be obtained enough. By contrast, when the conductive improver is added at an amount more than the range above, it might take additional time to dry the dispersion liquid, as well as it might cause deterioration to reduce the conductivity.

In addition, since the content of the conductive polymer in the dispersion liquid affects the handling properties of immersing a capacitor element therein and taking it out therefrom. Thus, it is usually preferable to adjust it at about a level of 0.5 to 15 mass %. In other words, when the content of the conductive polymer is less than the range above, it might take additional time for drying. By contrast, when the content of the conductive polymer is more than the range above, the viscosity of the dispersion liquid is increased, and thereby, the handling properties in producing an electrolyte capacitor might be deteriorated.

The conductive polymer obtained by drying the conductive polymer dispersion liquid as described above can be provided with the following features. That is, based on the characteristics of the polymer anion used as a dopant upon synthesis, it has high conductivity and superior heat resistance. Therefore, when it is used as a solid electrolyte, the electrolyte capacitor thus prepared can be provided with low ESR and high reliability under a hot condition.

When using the conductive polymer dispersion liquid of the present invention to prepare an electrolyte capacitor, a capacitor element is immersed in the conductive polymer dispersion liquid, and then taken out (pulled up), The conductive polymer after drying it can be used as a solid electrolyte. The solid electrolyte layer made of the conductive polymer is formed on the solid electrolyte layer which has made of a conductive polymer formed by using the monomer liquid for conductive polymer production of the present invention. However, the conductive polymer may be attached to other parts of the capacitor element. The solid electrolyte layer made of a conductive polymer from the dispersion liquid of the conductive polymer can be formed before forming the solid electrolyte layer made of a conductive polymer made from the monomer liquid for conductive polymer production of the present invention. Alternatively, instead of immersing the capacitor element in the conductive polymer dispersion liquid as explained above, the conductive polymer dispersion liquid can be sprayed or applied on the capacitor element.

Also, in order to increase the adhesiveness between the conductive polymer in the conductive polymer dispersion liquid and the conductive polymer formed by using the monomer liquid for conductive polymer production of the present invention, a binder can be added into the conductive polymer dispersion liquid. The example of such a binder can include polyvinyl alcohol, polyurethane, polyester, acrylic resin, polyamide, polyimide, epoxy resin, polyacrylonitrile resin, polymethacrylonitrile resin, polystyrene resin, novolac resin, sulfonated polyallyl, sulfonated polyvinyl, sulfonated polystyrene, and a silane coupling agent. In particular, preferably are polyester, polyurethane, acrylic resin, sulfonated polyallyl, sulfonated polyvinyl, and sulfonated polystyrene. In particular, preferably is one in which a sulfone group is included like sulfonated polyallyl, sulfonated polyvinyl, and sulfonated polystyrene, since the conductivity of the conductive polymer can be improved.

EXAMPLES

Next, the present invention is explained more in detail with reference to the Examples, but the construction of the present invention should not be limited to the Examples alone. It is noted that in the Examples, the indication of % for the concentration or content is mass % unless otherwise noted.

Regarding the Examples below, Examples 1 to 20, Examples 41 to 49 and Examples 59 to 67 demonstrate the samples of the monomer liquid for conductive polymer production, and Examples 21 to 40, Examples 50 to 58 and Examples 68 to 84 demonstrate the samples of the electrolyte capacitor.

Preparation of Monomer Liquid for Conductive Polymer Production (1)

Example 1

Into a beaker with an internal volume of 1 L having a stirrer, 100 g of ethylenedioxythiophene, 100 g of 2-methylimidazole naphthalenesulfonate and 60 g of ethanol were added. By stirring them for one hour, a monomer liquid for conductive polymer production was prepared. Here, 2-methylimidazole naphthalenesulfonate is a compound belonging to the naphthalene monosulfonic acid type heterocyclic compound.

The monomer liquid for this conductive polymer production was left at a condition of 20° C. for six months, and thereafter, it was observed. No precipitations were observed.

Example 2

Except for changing the amount of 2-methylimidazole naphthalenesulfonate from 100 g to 150 g, the same procedures as Example 1 were carried out to prepare a monomer liquid for conductive polymer production.

The monomer liquid for this conductive polymer production was left at a condition of 20° C. for six months, and thereafter, it was observed. No precipitations were observed.

Example 3

Except for changing the amount of 2-methylimidazole naphthalenesulfonate from 100 g to 50 g, the same procedures as Example 1 were carried out to prepare a monomer liquid for conductive polymer production.

The monomer liquid for this conductive polymer production was left for six months, and thereafter, it was observed. No precipitations were observed.

Example 4

Except for replacing 100 g of 2-methylimidazole naphthalenesulfonate with 100 g of 2-methylimidazole naphthalenetrisulfonate, the same procedures as Example 1 were carried out to prepare a monomer liquid for conductive polymer production. Here, 2-methylimidazole naphthalenetrisulfonate is a compound belonging to the naphthalene trisulfonic acid type heterocyclic compound.

The monomer liquid for this conductive polymer production was left at a condition of 20° C. for six months, and thereafter, it was observed. No precipitations were observed.

Example 5

Except for changing the amount of 2-methylimidazole naphthalenetrisulfonate from 100 g to 150 g, the same procedures as Example 4 were carried out to prepare a monomer liquid for conductive polymer production.

The monomer liquid for this conductive polymer production was left at a condition of 20° C. for six months, and thereafter, it was observed. No precipitations were observed.

Example 6

Except for changing the amount of 2-methylimidazole naphthalenetrisulfonate from 100 g to 50 g, the same procedures as Example 4 were carried out to prepare a monomer liquid for conductive polymer production.

The monomer liquid for this conductive polymer production was left at a condition of 20° C. for six months, and thereafter, it was observed. No precipitations were observed.

Example 7

Except for replacing 100 g of 2-methylimidazole naphthalenesulfonate with 100 g of 2-ethyl-4-methylimidazole naphthalenesulfonate, and replacing 60 g of ethanol with 60 g of n-butanol, the same procedures as Example 1 were carried out to prepare a monomer liquid for conductive polymer production. Here, 2-ethyl-4-methylimidazole naphthalenesulfonate is a compound belonging to the naphthalene monosulfonic acid type heterocyclic compound.

The monomer liquid for this conductive polymer production was left at a condition of 20° C. for six months, and thereafter, it was observed. No precipitations were observed.

Example 8

Except for replacing 100 g of 2-methylimidazole naphthalenesulfonate with 100 g of 2-ethyl-4-methylimidazole naphthalenetrisulfonate, and replacing 60 g of ethanol with 60 g of n-butanol, the same procedures as Example 1 were carried out to prepare a monomer liquid for conductive polymer production. Here, 2-ethyl-4-methylimidazole naphthalenetrisulfonate is a compound belonging to the naphthalene trisulfonic acid type heterocyclic compound.

The monomer liquid for this conductive polymer production was left at a condition of 20° C. for six months, and thereafter, it was observed. No precipitations were observed.

Example 9

Except for replacing 100 g of 2-methylimidazole naphthalenesulfonate with 50 g of 2-methylimidazole naphthalenesulfonate and 50 g of 2-methylimidazole naphthalenetrisulfonate, the same procedures as Example 1 were carried out to prepare a monomer liquid for conductive polymer production.

The monomer liquid for this conductive polymer production was left at a condition of 20° C. for six months, and thereafter, it was observed. No precipitations were observed.

Example 10

Except for replacing 100 g of ethylenedioxythiophene ethylenedioxythiophene with 50 g of ethylenedioxythiophene ethylenedioxythiophene and 50 g of butylated ethylenedioxythiophene, the same procedures as Example 1 were carried out to prepare a monomer liquid for conductive polymer production.

The monomer liquid for this conductive polymer production was left at a condition of 20° C. for six months, and thereafter, it was observed. No precipitations were observed.

Example 11

Except for replacing 100 g of ethylenedioxythiophene ethylenedioxythiophene with 10 g of ethylenedioxythiophene ethylenedioxythiophene and 90 g of ethylated ethylenedioxythiophene, the same procedures as Example 1 were carried out to prepare a monomer liquid for conductive polymer production.

The monomer liquid for this conductive polymer production was left at a condition of 20° C. for six months, and thereafter, it was observed. No precipitations were observed.

Example 12

Except for replacing 100 g of 2-methylimidazole naphthalenesulfonate with 100 g of 2-methylimidazole benezenesulfonate, the same procedures as Example 1 were carried out to prepare a monomer liquid for conductive polymer production.

The monomer liquid for this conductive polymer production was left at a condition of 20° C. for six months, and thereafter, it was observed. No precipitations were observed.

Example 13

Except for replacing 100 g of 2-methylimidazole naphthalenesulfonate with 100 g of 2-methylimidazole toluenesulfonate, the same procedures as Example 1 were carried out to prepare a monomer liquid for conductive polymer production.

The monomer liquid for this conductive polymer production was left at a condition of 20° C. for six months, and thereafter, it was observed. No precipitations were observed.

Example 14

Except for replacing 100 g of 2-methylimidazole naphthalenesulfonate with 100 g of 2-methylimidazole methoxybenezenesulfonate, the same procedures as Example 1 were carried out to prepare a monomer liquid for conductive polymer production.

The monomer liquid for this conductive polymer production was left at a condition of 20° C. for six months, and thereafter, it was observed. No precipitations were observed.

Example 15

Except for replacing 100 g of 2-methylimidazole naphthalenesulfonate with 100 g of 2-methylimidazole nitrobenezenesulfonate, the same procedures as Example 1 were carried out to prepare a monomer liquid for conductive polymer production.

The monomer liquid for this conductive polymer production was left at a condition of 20° C. for six months, and thereafter, it was observed. No precipitations were observed.

Example 16

Except for replacing 100 g of 2-methylimidazole naphthalenesulfonate with 100 g of 2-methylimidazole cumenesulfonate, the same procedures as Example 1 were carried out to prepare a monomer liquid for conductive polymer production.

The monomer liquid for this conductive polymer production was left at a condition of 20° C. for six months, and thereafter, it was observed. No precipitations were observed.

Example 17

Except for replacing 100 g of 2-methylimidazole naphthalenesulfonate with 50 g of 2-methylimidazole naphthalenesulfonate and 50 g of 2-methylimidazole benzenesulfonate, the same procedures as Example 1 were carried out to prepare a monomer liquid for conductive polymer production.

The monomer liquid for this conductive polymer production was left at a condition of 20° C. for six months, and thereafter, it was observed. No precipitations were observed.

Example 18

Except for replacing 100 g of 2-methylimidazole naphthalenesulfonate with 50 g of 2-methylimidazole naphthalenetrisulfonate and 50 g of 2-methylimidazole toluenesulfonate, the same procedures as Example 1 were carried out to prepare a monomer liquid for conductive polymer production.

The monomer liquid for this conductive polymer production was left at a condition of 20° C. for six months, and thereafter, it was observed. No precipitations were observed.

Example 19

Except for replacing 100 g of ethylenedioxythiophene ethylenedioxythiophene with 60 g of ethylenedioxythiophene ethylenedioxythiophene and 40 g of butylated ethylenedioxythiophene, the same procedures as Example 13 were carried out to prepare a monomer liquid for conductive polymer production.

The monomer liquid for this conductive polymer production was left at a condition of 20° C. for six months, and thereafter, it was observed. No precipitations were observed.

Example 20

Except for replacing 100 g of ethylenedioxythiophene ethylenedioxythiophene with 100 g of ethylated ethylenedioxythiophene, the same procedures as Example 16 were carried out to prepare a monomer liquid for conductive polymer production.

The monomer liquid for this conductive polymer production was left at a condition of 20° C. for six months, and thereafter, it was observed. No precipitations were observed.

Comparative Example 1

Except for replacing 100 g of 2-methylimidazole naphthalenesulfonate with 50 g of sodium naphthalenesulfonate, the same procedures as Example 1 were carried out to prepare a monomer liquid for conductive polymer production.

However, sodium naphthalenesulfonate was hardly dispersed so that no desirable monomer liquid for conductive polymer production could be prepared.

Comparative Example 2

Except for replacing 100 g of 2-methylimidazole naphthalenesulfonate with 50 g of sodium naphthalenetrisulfonate, the same procedures as Example 1 were carried out to prepare a monomer liquid for conductive polymer production.

However, sodium naphthalenetrisulfonate was hardly dispersed so that no desirable monomer liquid for conductive polymer production could be prepared.

Comparative Example 3

Except for replacing 100 g of 2-methylimidazole naphthalenesulfonate with 50 g of 2-methylimidazole phenolsulfonate, the same procedures as Example 1 were carried out to prepare a monomer liquid for conductive polymer production.

However, 2-methylimidazole phenolsulfonate was hardly dispersed so that no desirable monomer liquid for conductive polymer production could be prepared.

Comparative Example 4

Except for replacing 100 g of 2-methylimidazole naphthalenesulfonate with 50 g of 2-anthraquinonesulfonate, the same procedures as Example 1 were carried out to prepare a monomer liquid for conductive polymer production.

However, 2-methylimidazole anthraquinonesulfonate was not dispersed at all so that no desirable monomer liquid for conductive polymer production could be prepared.

Comparative Example 5

Except for replacing 100 g of 2-methylimidazole naphthalenesulfonate with 50 g of sodium benzenesulfonate, the same procedures as Example 1 were carried out to prepare a monomer liquid for conductive polymer production.

However, sodium benzenesulfonate was hardly dispersed so that no desirable monomer liquid for conductive polymer production could be prepared.

Then, electrolyte capacitors of Examples 21 to 40 were prepared by using the monomer liquids for conductive polymer production of Examples 1 to 20 as described above. By measuring the characteristics of the electrolyte capacitors, the characteristics of the monomer liquids for conductive polymer production of Examples 1 to 20 were also evaluated.

Before describing Examples 21 to 40 regarding the electrolyte capacitors, production examples to prepare two kinds of polymer anion type conductive polymer dispersion liquids to be used in Examples 21 to 40.

Production Example of Conductive Polymer Dispersion Liquid (I)

1 L of pure water was added into a separable flask with a stirrer with an internal volume of 2 L, into which 170 g of sodium styrenesulfonate and 30 g of hydroxyethyl acrylate were added. Then, 1 g of ammonium persulfate as an oxidant was added into the solution. There, polymerization reaction of styrenesulfonic acid and hydroxyethyl acrylate was conducted for 12 hours. The reaction liquid after the polymerization was treated with an ultrafiltration device [VIVAFLOW 200 (product name) made by Sartorius Corporation, in a condition of a molecular weight fraction of 50,000] to remove free components having low molecular weights in the liquid. Then, water was added therein to adjust the concentration into 3%.

With respect to the copolymer of styrenesulfonic acid and hydroxyethyl acrylate as obtained above, the weight average molecular weight was estimated by using a gel filtration column. As a result, it was estimated as 180,000 based on dextran as a calibration standard.

600 g of 3% aqueous solution of the copolymer of styrenesulfonic acid and hydroxyethyl acrylate was put in a stainless steel container with an internal volume of 1 L, into which 0.3 g of ferrous sulfate having 7 hydrates was added. Then, 4 mL of ethylenedioxythiophene was gradually dropped therein.

They were stirred by the stirrer blade made of stainless steel, and a positive electrode was attached to the container, and a negative electrode was attached to the base of the stirrer blade. A constant current of 1 mA/cm$^2$ was applied to carry out an electrolytic oxidation polymerization for 18 hours. After the electrolytic oxidation polymerization above, the mixture was diluted with 6 times of water. Then, a dispersion treatment was carried out by using an ultrasonic homogenizer [Nippon Seiki Co., Ltd., US-T300 (commercial name)] for two hours. Then, 100 g of cation exchange resin [AMBERLITE 120B (commercial name)] manufactured by Organo Corporation was added, and the mixture was stirred for one hour. Then, the mixture was filtered with filter paper No. 131 manufactured by Toyo Roshi Kaisha, Ltd. The treatment by the cation exchange resin and the filtration was repeated three times to remove all the cationic components, such as iron ions, in the liquid.

Thereby treated liquid was filtered with a filter having a pore size of 1 m. Thereby filtered liquid was treated with an ultrafiltration device [VIVAFLOW 200 (product name) made by Sartorius Corporation, in a condition of a molecular weight fraction of 50,000], to remove free components having low molecular weights in the liquid. Thereby treated liquid was diluted with water to adjust its concentration of the solution at 2%. Then, into 50 g of the solution, 3 g of dimethyl sulfoxide was added to obtain a conductive polymer dispersion liquid (I).

Production Example of Conductive Polymer Dispersion Liquid (II)

200 g of 3% sulfonated polyester [PLASCOAT Z-561 (brand name) manufactured by Goo Chemical Co., Ltd.; weight average molecular weight of 27,000] aqueous solution was put into a beaker with an internal volume of 1 L. 2 g of ammonium persulfate was added therein, and was dissolved by stirring them by a stirrer. Then, 0.4 g of 40% aqueous solution of ferric sulfate was added. While stirring, ethylenedioxythiophene ethylenedioxythiophene (3 mL) was dropped slowly therein to polymerize the ethylenedioxythiophene ethylenedioxythiophene for 24 hours.

After the polymerization above, the mixture was diluted with 4 times of water in volume. Then, a dispersion treatment was carried out by using an ultrasonic homogenizer [Nippon Seiki Co., Ltd., US-T300] for 30 minutes. Then, 100 g of cation exchange resin [AMBERLITE 120B (commercial name)] manufactured by Organo Corporation was added, and the mixture was stirred for one hour. After stirring by a stirrer for one hour, filtration was performed by using a filter paper, No. 131 made by Toyo Roshi Kaisha, Ltd. The operation from the dispersion to the filtration was repeated three times to remove all the cationic components.

The filtered liquid above was passed through a filter having a pore size of 1 m. Thereby filtered liquid was treated with an ultrafiltration device [VIVAFLOW 200 (product name) made by Sartorius Corporation, in a condition of a molecular weight fraction of 50,000] to remove free components having low molecular weights. The solution above was diluted with water to adjust its concentration at 5%. Then, into 40 g of the solution, 8 g of ethanol and 4 g of dimethyl sulfoxide were added to obtain a conductive polymer dispersion liquid (II).

[Evaluation of the Electrolyte Capacitor (1)]

For the evaluation of the electrolyte capacitor (1), as described before, electrolyte capacitors of Example 21 to 40 were prepared by using the monomer liquids for conductive polymer production of Examples 1 to 20 as described above. By measuring the characteristics of the electrolyte capacitors, the characteristics of the monomer liquids for conductive polymer production of Examples 1 to 20 were also evaluated.

Example 21

For the capacitor element of the electrolyte capacitor of Example 21, a tantalum sintering body was used, which had been designed to have a rated voltage of 16 V, an ESR of 20 mΩ or less, a capacitance of 800 μF or more, and a leak current of 100 μA or less.

Then, the capacitor element was immersed in the monomer liquid for conductive polymer production prepared in Example 1 for two minutes, and then, it was taken out, and dried at 50° C. for ten minutes. Then, the capacitor element above was immersed in a 35% ammonium persulfate aqueous solution for two minutes, and then it was taken out. After leaving it at room temperature (25° C.) for ten minutes, it was heated at 50° C. for 30 minutes for carrying out polymerization. Then, the capacitor element above was immersed for 30 minutes in a cleaning liquid made by mixing pure water with ethanol at a mass ratio of 1:1, and then it was taken out, and then dried at 150° C. for 30 minutes. The operation above was repeated five times to form a first solid electrolyte layer made of a conductive polymer on the capacitor element.

Then, the capacitor element above was immersed in the conductive polymer dispersion liquid (I) prepared as described before, and then it was taken out, and then it was dried at 150° C. for 30 minutes. This operation was repeated twice. Thereby, on the first solid electrolyte layer made of the conductive polymer prepared by polymerization of the monomer in the monomer liquid for conductive polymer production that was prepared in Example 1, formed was a second solid electrolyte layer made of another conductive polymer by immersing it into the conductive polymer dispersion liquid (I) mentioned above followed by drying (this second solid electrolyte layer is hereinafter simply referred to as "the second solid electrolyte layer based on the conductive polymer dispersion liquid (I)."

Furthermore, the capacitor element above was immersed in the conductive polymer dispersion liquid (II) for one minute, and then it was taken out, and then it was dried at 150° C. for 30 minutes. Thereby, on the second solid electrolyte layer from the conductive polymer dispersion liquid (I), a third solid electrolyte layer prepared by immersing into the conductive polymer dispersion liquid (II) followed by drying was formed (which is hereinafter simply referred to as "third solid electrolyte layer made from the conductive polymer dispersion liquid (II)."

Then, the solid electrolyte layer was coated with carbon paste and silver paste to obtain a tantalum type electrolyte capacitor.

Examples 22 to 40

Except for replacing the monomer liquid for conductive polymer production prepared in Example 1 with the monomer liquid for conductive polymer productions prepared in Examples 2 to 20, respectively, the same procedures as Example 21 were carried out to produce tantalum type electrolyte capacitors of Examples 22 to 40.

Comparative Example 6

The capacitor element like Example 21 was immersed in an ethanol solution of 30% ethylenedioxythiophene ethylenedioxythiophene for two minutes, and then it was taken out, and then left at room temperature for ten minutes. Then, it was immersed in an ethanol solution of 40% ferric p-toluenesulfonate for 30 seconds, and it was taken out, and left at room temperature for ten minutes. Then, it was heated at 50° C. for 30 minutes for carrying out polymerization. Then, the capacitor element above was immersed for 30 minutes in a cleaning liquid made by mixing pure water with ethanol at a mass ratio of 1:1, and then it was taken out, and then dried at 150° C. for 30 minutes. The operation above was repeated five times to form a first solid electrolyte layer made of a conductive polymer on the capacitor element.

Then, by carrying out the similar treatment as performed in Example 21, on the first solid electrolyte layer mentioned above, sequentially formed is a second solid electrolyte layer made of the conductive polymer dispersion liquid (I), and a third solid electrolyte layer made of the conductive polymer dispersion liquid (II). Then, a coating treatment by carbon paste and silver paste was carried out to produce a tantalum type electrolyte capacitor.

Comparative Example 7

The capacitor element like Example 21 was immersed in a 35% ethylenedioxythiophene ethylenedioxythiophene solution (an ethanol solution) for one minute, and then it was taken out, and then left for five minutes. Then, the capacitor element above was immersed in an oxidant and dopant agent solution prepared beforehand, the oxidant and dopant agent solution made of a mixtures by mixing a 50% butylamine phenolsulfonate aqueous solution (pH 5) and a 30% ammonium persulfate aqueous solution at a mass ratio of 1:1. The capacitor element above was immersed in the oxidant and dopant agent solution for 30 seconds, and it was taken out, and then left at room temperature for ten minutes. Then, it was heated at 50° C. for 20 minutes to carry out polymerization. Then, the capacitor element above was immersed for 30 minutes in a cleaning liquid made by mixing pure water with ethanol at a mass ratio of 1:1, and then it was taken out, and then dried at 150° C. for 30 minutes. The operation above was repeated five times to form a first solid electrolyte layer made of a conductive polymer through the chemical oxidation polymerization of ethylenedioxythiophene.

Then, the capacitor element above was immersed in the conductive polymer dispersion liquid (I) for one minute, and then it was taken out, and then it was dried at 150° C. for 30 minutes. This operation was repeated twice. Thereby, on the first solid electrolyte layer, a second solid electrolyte layer based on the conductive polymer dispersion liquid (I) was formed.

In addition, the capacitor element above was immersed in the conductive polymer dispersion liquid (II) for one minute, and then it was taken out, and then it was dried at 150° C. for 30 minutes. Thereby, on the second solid electrolyte layer based on the conductive polymer dispersion liquid (I), a third solid electrolyte layer based on the conductive polymer dispersion liquid (II) was formed.

Then, the solid electrolyte layer above was coated with carbon paste and silver paste to obtain a tantalum type electrolyte capacitor.

Comparative Example 8

Into a 50% of 2-methylimidazole naphthalenesulfonate ethanol solution (pH 5 to 6), the capacitor element like Example 21 was immersed for one minute, and then it was taken out, and left at room temperature for five minutes. Then, the capacitor element above was immersed in a 45% ammonium persulfate aqueous solution for 30 seconds, and it was taken out, and then left at room temperature for ten minutes. Then, the capacitor element above was immersed in ethylenedioxythiophene (i.e., 100% ethylenedioxythiophene) for five minutes, and then it was taken out, and then left at room temperature for 60 minutes to polymerize the ethylenedioxythiophene. Then, the capacitor element above was immersed in pure water for 30 minutes, and then it was taken out, and then dried for 30 minutes. The operation above was repeated five times to form a first solid electrolyte layer made of a conductive polymer through the chemical oxidation polymerization of ethylenedioxythiophene.

Then, the capacitor element above was immersed in the conductive polymer dispersion liquid (I) for one minute, and then it was taken out, and then it was dried at 150° C. for 30 minutes. This operation was repeated twice. Thereby, on the first solid electrolyte layer made of a conductive polymer through the chemical oxidation polymerization of ethylenedioxythiophene, a second solid electrolyte layer based on the conductive polymer dispersion liquid (I) was formed.

In addition, the capacitor element above was immersed in the conductive polymer dispersion liquid (II) for one minute, and then it was taken out, and then it was dried at 150° C. for 30 minutes. Thereby, on the second solid electrolyte layer based on the conductive polymer dispersion liquid (I), a third solid electrolyte layer based on the conductive polymer dispersion liquid (II) was formed.

Then, the solid electrolyte layer above was coated with carbon paste and silver paste to obtain a tantalum type electrolyte capacitor.

With respect to the tantalum type electrolyte capacitors of Examples 21 to 40 and Comparative Examples 6 to 8 as produced above, the ESR and the capacitance were measured, as well as the leakage current was measured. The results are shown in Table 1, along with the kinds of the monomer liquids for conductive polymer production used. The explanations below are the measuring methods of the ESR, the capacitance and the leakage current.

ESR:

Using an LCR meter (4284A) made by HEWLETT PACKARD Corporation, it was measured at 100 kHz at a condition of 25° C.

Capacitance:

Using an LCR meter (4284A) made by HEWLETT PACKARD Corporation, it was measured at 120 Hz at a condition of 25° C.

Leakage Current:

A voltage of 16 V was applied to the electrolyte capacitor at 25° C. for 60 seconds. Then, a leakage current was measured with a digital oscilloscope.

In the measurement, ten samples of each Example were used. The values of ESR, shown in Table 1, were obtained by averaging the results of the ten samples while rounding off the number of the second decimal place. The values of capacitance and leakage current, shown in Table 1, were obtained by averaging the results of the ten samples while rounding off the numbers after the decimal point. Also, the kind of the monomer liquid for conductive polymer production used in each of Examples 21 to 40 is expressed by the number of the Example. In Table 1, for the purpose of saving the space, "the kind of the monomer liquid for conductive polymer production" as mentioned above is simply shown as "the kind of the monomer."

TABLE 1

| | | Initial Characteristic | | |
|---|---|---|---|---|
| | Kind of Monomer Liquid | ESR (mΩ) | Capacitance (μF) | Leak Current (μA) |
| Example 21 | Example 1 | 13.5 | 849 | 9 |
| Example 22 | Example 2 | 14.2 | 858 | 9 |
| Example 23 | Example 3 | 14.3 | 842 | 6 |

TABLE 1-continued

|  | Kind of Monomer Liquid | Initial Characteristic | | |
|---|---|---|---|---|
|  |  | ESR (mΩ) | Capacitance (μF) | Leak Current (μA) |
| Example 24 | Example 4 | 12.8 | 888 | 7 |
| Example 25 | Example 5 | 13.1 | 889 | 9 |
| Example 26 | Example 6 | 13.1 | 891 | 6 |
| Example 27 | Example 7 | 13.7 | 855 | 9 |
| Example 28 | Example 8 | 12.7 | 888 | 7 |
| Example 29 | Example 9 | 12.3 | 887 | 7 |
| Example 30 | Example 10 | 11.8 | 901 | 3 |
| Example 31 | Example 11 | 11.9 | 899 | 5 |
| Example 32 | Example 12 | 14.8 | 870 | 9 |
| Example 33 | Example 13 | 14.8 | 865 | 9 |
| Example 34 | Example 14 | 14.5 | 860 | 7 |
| Example 35 | Example 15 | 14.9 | 859 | 8 |
| Example 36 | Example 16 | 14.8 | 855 | 8 |
| Example 37 | Example 17 | 13.1 | 889 | 8 |
| Example 38 | Example 18 | 13.2 | 886 | 8 |
| Example 39 | Example 19 | 11.4 | 901 | 4 |
| Example 40 | Example 20 | 11.5 | 900 | 5 |
| Comp. Ex. 6 |  | 16.9 | 821 | 53 |
| Comp. Ex. 7 |  | 15.2 | 841 | 9 |
| Comp. Ex. 8 |  | 17.3 | 680 | 9 |

Also, after the measurements of the initial characteristics as shown in Table 1 above, the tantalum type electrolyte capacitors of Examples 21 to 40 and Comparative Examples 6 to 8 were left at a still state in a dryer at 150° C. for 240 hours. On the capacitors after the storage, the ESR, the capacitance and the leakage current were measured in the same manner as before. The results are shown in Table 2 in the same manner as Table 1.

TABLE 2

|  | Kind of Monomer Liquid | After storage at 150° C. for 240 hours | | |
|---|---|---|---|---|
|  |  | ESR (mΩ) | Capacitance (μF) | Leak Current (μA) |
| Example 21 | Example 1 | 14.1 | 840 | 17 |
| Example 22 | Example 2 | 14.9 | 853 | 17 |
| Example 23 | Example 3 | 15.0 | 838 | 16 |
| Example 24 | Example 4 | 13.3 | 884 | 15 |
| Example 25 | Example 5 | 13.6 | 886 | 15 |
| Example 26 | Example 6 | 13.6 | 887 | 14 |
| Example 27 | Example 7 | 14.5 | 848 | 14 |
| Example 28 | Example 8 | 13.2 | 884 | 12 |
| Example 29 | Example 9 | 12.8 | 883 | 12 |
| Example 30 | Example 10 | 12.3 | 898 | 4 |
| Example 31 | Example 11 | 12.4 | 895 | 6 |
| Example 32 | Example 12 | 16.3 | 860 | 17 |
| Example 33 | Example 13 | 15.9 | 854 | 17 |
| Example 34 | Example 14 | 15.5 | 851 | 16 |
| Example 35 | Example 15 | 15.8 | 850 | 17 |
| Example 36 | Example 16 | 15.6 | 841 | 15 |
| Example 37 | Example 17 | 13.7 | 881 | 14 |
| Example 38 | Example 18 | 13.8 | 879 | 16 |
| Example 39 | Example 19 | 11.8 | 896 | 5 |
| Example 40 | Example 20 | 11.9 | 895 | 9 |
| Comp. Ex. 6 |  | 104.3 | 797 | 108 |
| Comp. Ex. 7 |  | 21.6 | 829 | 18 |
| Comp. Ex. 8 |  | 18.8 | 602 | 17 |

As shown in Table 1, the tantalum type electrolyte capacitors of Examples 21 to 40 (which hereinafter may be simply referred to as "capacitor") had: an ESR of 11.4 to 14.8 mΩ, thereby satisfying a set value of the ESR to be 20 mΩ or less; a leak current of 3 to 9 μA, thereby satisfying a set value of the leak current to be 100 μA or less; a capacitance of 842 to 901 μF, and thereby satisfying a set value of the capacitance to be 800 μF or more. In addition, they had an ESR value lower (smaller) than the capacitors of Comparative Examples 6 to 8. They had a capacitance larger than the capacitors of Comparative Examples 6 to 8. They had a leak current equivalent to or lower than the capacitors of Comparative Examples 6 to 8, and did not bring any significant characteristic drops.

Also, as shown it Table 2, the capacitors of Examples 21 to 40 had the following features. Even after the storage at 150° C. for 240 hours, the increases of ESR and the leak current were little, and the decreases of the capacitance were little. They had an ESR of 11.8 to 16.3 mΩ, thereby satisfying a set value of the ESR to be 20 mΩ or less; a capacitance of 840 to 898 μF, thereby satisfying a set value of the capacitance to be 800 μF or more; and a leak current of 5 to 17 μA, thereby satisfying a set value of the leak current to be 100 μA or less.

Here, the capacitors of Comparative Examples 6 to 8 had the features below. The capacitor of Comparative Example 6 was prepared by using ferric p-toluenesulfonate as an oxidant and dopant agent at the time when forming the first solid electrolyte layer. Therefore, it had the initial characteristics based on the iron of the oxidant. As shown in Table 1, it had a large amount of leak current. Among the 20 samples, two samples caused shorting (i.e., short circuit) during the measurement of the leak current. Also, in case of the capacitor of Comparative Example 6, characteristics after the storage at 150° C. for 240 hours had the following features. As shown in Table 2, the increases of the ESR and the leak current, and the decreases of the capacitance were more significant than capacitors of Examples 21 to 40, and therefore, the capacitor of Comparative Example 6 was inferior in the heat resistance.

The capacitor of Comparative Example 7 was prepared by using an oxidant and dopant agent of a non-iron salt type in the preparation of the conductive polymer constituting the first solid electrolyte layer. Therefore, it had the initial characteristic as shown in Table 1. Namely, though the leak current was not large, the capacitance was smaller than the capacitors of Examples 21 to 40. Also, even after the storage at 150° C. for 240 hours, as shown in Table 2 there were slightly large amounts of increases of the ESR and decreases of the capacitance. Therefore, there is a room to be improved more about the heat resistance.

The capacitor of Comparative Example 8 was prepared as follows. The synthesis of the conductive polymer constituting the first solid electrolyte layer was made by separating the dopant (i.e., 2-methylimidazole naphthalenesulfonate) from the monomer (i.e., ethylenedioxythiophene). In addition, in order to prevent the deterioration during the storage, the dopant solution was separately provided from the oxidant solution including the ammonium persulfate. Then, the capacitor element was immersed in the dopant solution, and then, immersed in the oxidant solution, and then, immersed in the monomer. Therefore, it had the initial characteristics shown in Table 1. Namely, its capacitance was significantly smaller than those of the capacitors of Examples 21 to 40. Also, after the storage at 150° C. for 240 hours, as shown in Table 2, the decrease of the capacitance was significant than those of the capacitors of Examples 21 to 40. Therefore, it had a problem in the heat resistance. The reasons of such features are considered as follows. The dopant was reacted with the oxidant at the surface of the capacitor element to form a salt, which makes it difficult for not only the dopant and the oxidant but the monomer to enter the inside of the capacitor element.

Preparation of Monomer Liquid for Conductive Polymer Production (2)

Example 41

Except for replacing 100 g of 2-methylimidazole naphthalenesulfonate with 100 g of 4-methylimidazole naphthalenesulfonate, the same procedures as Example 1 were carried out to prepare a monomer liquid for conductive polymer production.

The monomer liquid for this conductive polymer production was left at a condition of 20° C. for six months, and thereafter, it was observed. No precipitations were observed.

Example 42

Except for replacing 100 g of 2-methylimidazole naphthalenesulfonate with 100 g of triazole naphthalenesulfonate, the same procedures as Example 1 were carried out to prepare a monomer liquid for conductive polymer production.

The monomer liquid for this conductive polymer production was left at a condition of 20° C. for six months, and thereafter, it was observed. No precipitations were observed.

Example 43

Except for replacing 100 g of 2-methylimidazole naphthalenetrisulfonate with 100 g of imidazole naphthalenetrisulfonate, the same procedures as Example 4 were carried out to prepare a monomer liquid for conductive polymer production.

The monomer liquid for this conductive polymer production was left at a condition of 20° C. for six months, and thereafter, it was observed. No precipitations were observed.

Example 44

Except for replacing 100 g of 2-methylimidazole naphthalenetrisulfonate with 100 g of 1-methylimidazole naphthalenetrisulfonate along with further adding 10 g of 2-(3,4-epoxycyclohexyl)ethyltrimethoxysilane, the same procedures as Example 4 were carried out to prepare a monomer liquid for conductive polymer production.

The monomer liquid for this conductive polymer production was left at a condition of 20° C. for six months, and thereafter, it was observed. No precipitations were observed.

Example 45

Except for replacing 100 g of 2-methylimidazole naphthalenetrisulfonate with 100 g of 2-methyl-4-ethylimidazole naphthalenetrisulfonate, and replacing 100 g of ethylenedioxythiophene with 100 g of ethylated ethylenedioxythiophene, and further adding 5 g of polysiloxane, the same procedures as Example 4 were carried out to prepare a monomer liquid for conductive polymer production.

The monomer liquid for this conductive polymer production was left at a condition of 20° C. for six months, and thereafter, it was observed. No precipitations were observed.

Example 46

Except for replacing 100 g of 2-methylimidazole naphthalenetrisulfonate with 100 g of triazine naphthalenetrisulfonate, and replacing 100 g of ethylenedioxythiophene with 50 g of butylated ethylenedioxythiophene and 50 g of ethylenedioxythiophene, and further adding 10 g of glycidyl methacrylate, the same procedures as Example 4 were carried out to prepare a monomer liquid for conductive polymer production.

The monomer liquid for this conductive polymer production was left at a condition of 20° C. for six months, and thereafter, it was observed. No precipitations were observed.

Example 47

Except for replacing 100 g of 2-methylimidazole naphthalenetrisulfonate with 100 g of pyridine naphthalenetrisulfonate, and further adding 8 g of 3-glycidoxypropyltrimethoxysilane and 8 g of polyethylene glycol diglycidyl ether, the same procedures as Example 45 were carried out to prepare a monomer liquid for conductive polymer production.

The monomer liquid for this conductive polymer production was left at a condition of 20° C. for six months, and thereafter, it was observed. No precipitations were observed.

Example 48

Except for replacing 100 g of 2-methylimidazole naphthalenetrisulfonate with 100 g of morpholine naphthalenetrisulfonate, the same procedures as Example 45 were carried out to prepare a monomer liquid for conductive polymer production.

The monomer liquid for this conductive polymer production was left at a condition of 20° C. for six months, and thereafter, it was observed. No precipitations were observed.

Example 49

Except for replacing 100 g of 2-methylimidazole naphthalenetrisulfonate with 100 g of piperazine naphthalenetrisulfonate, the same procedures as Example 45 were carried out to prepare a monomer liquid for conductive polymer production.

The monomer liquid for this conductive polymer production was left at a condition of 20° C. for six months, and thereafter, it was observed. No precipitations were observed.

[Evaluation of the Electrolyte Capacitor (2)]

For the evaluation of the electrolyte capacitor (2), the electrolyte capacitors of Example 50 to 58 were prepared by using the monomer liquids for conductive polymer production of Examples 41 to 49 as described above. By measuring the characteristics of the electrolyte capacitors, their characteristics were evaluated.

Examples 50 to 58

Except for replacing the monomer liquid for conductive polymer production prepared in Example 1 with the monomer liquid for conductive polymer productions prepared in Examples 41 to 49, respectively, the same procedures as Example 21 were carried out to produce tantalum type electrolyte capacitors of Examples 50 to 58.

With respect to the tantalum type electrolyte capacitors of Examples 50 to 58 as produced above, the ESR and the capacitance were measured, as well as the leakage current was measured. The results are shown in Table 3 in the same manner as Table 1.

TABLE 3

| | Kind of Monomer Liquid | Initial Characteristic | | |
|---|---|---|---|---|
| | | ESR (mΩ) | Capacitance (μF) | Leak Current (μA) |
| Example 50 | Example 41 | 13.5 | 849 | 9 |
| Example 51 | Example 42 | 13.7 | 852 | 9 |
| Example 52 | Example 43 | 12.7 | 889 | 7 |
| Example 53 | Example 44 | 12.7 | 888 | 4 |
| Example 54 | Example 45 | 11.8 | 900 | 1 |
| Example 55 | Example 46 | 11.7 | 899 | 1 |
| Example 56 | Example 47 | 11.9 | 898 | 1 |
| Example 57 | Example 48 | 11.8 | 897 | 1 |
| Example 58 | Example 49 | 11.8 | 899 | 1 |

Also, after the measurements of the initial characteristics as shown in Table 3 above, the tantalum type electrolyte capacitors of Examples 50 to 58 were left at a still state in a dryer at 150° C. for 240 hours. On the capacitors after the storage, the ESR, the capacitance and the leakage current were measured in the same manner as before. The results are shown in Table 4 in the same manner as Table 3.

TABLE 4

| | Kind of Monomer Liquid | After storage at 150° C. for 240 hours | | |
|---|---|---|---|---|
| | | ESR (mΩ) | Capacitance (μF) | Leak Current (μA) |
| Example 50 | Example 41 | 14.1 | 840 | 18 |
| Example 51 | Example 42 | 14.3 | 841 | 19 |
| Example 52 | Example 43 | 13.1 | 884 | 15 |
| Example 53 | Example 44 | 13.2 | 883 | 5 |
| Example 54 | Example 45 | 12.3 | 895 | 1 |
| Example 55 | Example 46 | 12.2 | 894 | 1 |
| Example 56 | Example 47 | 12.4 | 893 | 1 |
| Example 57 | Example 48 | 12.3 | 892 | 1 |
| Example 58 | Example 49 | 12.4 | 894 | 1 |

As shown in Table 3, the tantalum type electrolyte capacitors of Examples 50 to 58 (which hereinafter may be simply referred to as "capacitor") had: an ESR of 11.7 to 13.5 mΩ, thereby satisfying a set value of the ESR to be 20 mΩ or less; a capacitance of 849 to 900 μF, thereby satisfying a set value of the capacitance to be 800 μF or more; and a leak current of 1 to 9 microamperes, thereby satisfying a set value of the leak current to be 100 microamperes or less. In addition, compared with the capacitor of Comparative Example 6 shown in Table 1, it had a lower (smaller) ESR, a larger capacitance, significantly less leak current.

Also, as shown it Table 4, the capacitors of Examples 50 to 58 had the following features. Even after the storage at 150° C. for 240 hours, the increases of ESR and the leak current were little, and the decrease of the capacitance was little. They had an ESR of 12.2 to 14.1 mΩ, thereby satisfying a set value of the ESR to be 20 mΩ or less; a capacitance of 840 to 895 μF, thereby satisfying a set value of the capacitance to be 800 μF or more; and a leak current of 1 to 18 μA, thereby satisfying a set value of the leak current to be 100 μA or less.

Preparation of Monomer Liquid for Conductive Polymer Production (3)

Example 59

Except for replacing 100 g of 2-methylimidazole naphthalenesulfonate with 100 g of 4-methylimidazole naphthalenesulfonate and further adding 7 g of pyrrole, the same procedures as Example 1 were carried out to prepare a monomer liquid for conductive polymer production. Here, the quantity of the pyrrole added with respect to the thiophene type monomer was 7%. The monomer in the monomer liquid for conductive polymer production of Example 59 was a mixture of ethylenedioxythiophene and pyrrole. As being clear from the quantity of pyrrole as mentioned above, the content of pyrrole in the mixture was 7% with respect to ethylenedioxythiophene.

The monomer liquid for this conductive polymer production was left at a condition of 20° C. for six months, and thereafter, it was observed. No precipitations were observed.

Example 60

Except for replacing 100 g of 2-methylimidazole naphthalenesulfonate with 100 g of triazole naphthalenesulfonate, and further adding 20 g of pyrrole, the same procedures as Example 1 were carried out to prepare a monomer liquid for conductive polymer production. Here, the quantity of the pyrrole added with respect to the thiophene type monomer was 20%.

The monomer liquid for this conductive polymer production was left at a condition of 20° C. for six months, and thereafter, it was observed. No precipitations were observed.

Example 61

Except for replacing 100 g of 2-methylimidazole naphthalenetrisulfonate with 100 g of imidazole naphthalenetrisulfonate and further adding 10 g of pyrrole, the same procedures as Example 4 were carried out to prepare a monomer liquid for conductive polymer production. Here, the quantity of the pyrrole added with respect to the thiophene type monomer was 10%.

The monomer liquid for this conductive polymer production was left at a condition of 20° C. for six months, and thereafter, it was observed. No precipitations were observed.

Example 62

Except for replacing 100 g of 2-methylimidazole naphthalenetrisulfonate with 100 g of 1-methylimidazole naphthalenetrisulfonate, further adding 20 g of pyrrole and 10 g of 2-(3,4-epoxycyclohexyl)ethyltrimethoxysilane, the same procedures as Example 4 were carried out to prepare a monomer liquid for conductive polymer production. Here, the quantity of the pyrrole added with respect to the thiophene type monomer was 20%.

The monomer liquid for this conductive polymer production was left at a condition of 20° C. for six months, and thereafter, it was observed. No precipitations were observed.

Example 63

Except for replacing 100 g of 2-methylimidazole naphthalenetrisulfonate with 100 g of 2-methyl-4-ethylimidazole naphthalenetrisulfonate, and replacing 100 g of ethylenedioxythiophene with 100 g of ethylated ethylenedioxythiophene, and further adding 25 g of pyrrole and 5 g of polysiloxane, the same procedures as Example 4 were carried out to prepare a monomer liquid for conductive polymer production. Here, the quantity of the pyrrole added with respect to the thiophene type monomer was 25%.

The monomer liquid for this conductive polymer production was left at a condition of 20° C. for six months, and thereafter, it was observed. No precipitations were observed.

Example 64

Except for replacing 100 g of 2-methylimidazole naphthalenetrisulfonate with 100 g of triazine naphthalenetrisulfonate, and replacing 100 g of ethylenedioxythiophene with 50 g of butylated ethylenedioxythiophene and 50 g of ethylenedioxythiophene, and further adding 30 g of pyrrole and 10 g of glycidyl methacrylate, the same procedures as Example 4 were carried out to prepare a monomer liquid for conductive polymer production. Here, the quantity of the pyrrole added with respect to the thiophene type monomer was 30%.

The monomer liquid for this conductive polymer production was left at a condition of 20° C. for six months, and thereafter, it was observed. No precipitations were observed.

Example 65

Except for replacing 100 g of 2-methylimidazole naphthalenetrisulfonate with 100 g of pyridine naphthalenetrisulfonate, and further adding 8 g of 3-glycidoxypropyltrimethoxysilane and 8 g of polyethylene glycol diglycidyl ether, the same procedures as Example 63 were carried out to prepare a monomer liquid for conductive polymer production. Here, the quantity of the pyrrole added with respect to the thiophene type monomer was 25%.

The monomer liquid for this conductive polymer production was left at a condition of 20° C. for six months, and thereafter, it was observed. No precipitations were observed.

Example 66

Except for replacing 100 g of 2-methylimidazole naphthalenetrisulfonate with 100 g of morpholine naphthalenetrisulfonate, the same procedures as Example 63 were carried out to prepare a monomer liquid for conductive polymer production. Here, the quantity of the pyrrole added with respect to the thiophene type monomer was 25%.

The monomer liquid for this conductive polymer production was left at a condition of 20° C. for six months, and thereafter, it was observed. No precipitations were observed.

Example 67

Except for replacing 100 g of 2-methylimidazole naphthalenetrisulfonate with 100 g of piperazine naphthalenetrisulfonate, the same procedures as Example 63 were carried out to prepare a monomer liquid for conductive polymer production. Here, the quantity of the pyrrole added with respect to the thiophene type monomer was 25%.

The monomer liquid for this conductive polymer production was left at a condition of 20° C. for six months, and thereafter, it was observed. No precipitations were observed.

Evaluation of the Electrolyte Capacitor (3)

Examples 68 to 76

Except for replacing the monomer liquid for conductive polymer production prepared in Example 1 with the monomer liquid for conductive polymer productions prepared in Examples 59 to 67, respectively, the same procedures as Example 21 were carried out to produce tantalum type electrolyte capacitors of Examples 68 to 76.

With respect to the tantalum type electrolyte capacitors of Examples 68 to 76 as produced above, the ESR and the capacitance were measured, as well as the leakage current was measured. The results are shown in Table 5 in the same manner as Table 1.

TABLE 5

| | | Initial Characteristic | | |
|---|---|---|---|---|
| | Kind of Monomer Liquid | ESR (mΩ) | Capacitance (μF) | Leak Current (μA) |
| Example 68 | Example 59 | 13.3 | 860 | 9 |
| Example 69 | Example 60 | 13.3 | 861 | 8 |
| Example 70 | Example 61 | 12.3 | 899 | 7 |
| Example 71 | Example 62 | 12.2 | 903 | 3 |
| Example 72 | Example 63 | 11.0 | 907 | 1 |
| Example 73 | Example 64 | 11.1 | 905 | 1 |
| Example 74 | Example 65 | 11.4 | 903 | 1 |
| Example 75 | Example 66 | 11.3 | 902 | 5 |
| Example 76 | Example 67 | 11.4 | 900 | 4 |

Also, after the measurements of the initial characteristics as shown in Table 5 above, the tantalum type electrolyte capacitors of Examples 68 to 76 were left at a still state in a dryer at 150° C. for 240 hours. On the capacitors after the storage, the ESR, the capacitance and the leakage current were measured in the same manner as before. The results are shown in Table 6 in the same manner as Table 5.

TABLE 6

| | | After storage at 150° C. for 240 hours | | |
|---|---|---|---|---|
| | Kind of Monomer Liquid | ESR (mΩ) | Capacitance (μF) | Leak Current (μA) |
| Example 68 | Example 59 | 13.9 | 852 | 14 |
| Example 69 | Example 60 | 13.8 | 853 | 13 |
| Example 70 | Example 61 | 12.7 | 893 | 11 |
| Example 71 | Example 62 | 12.6 | 899 | 2 |
| Example 72 | Example 63 | 11.5 | 902 | 1 |
| Example 73 | Example 64 | 11.6 | 901 | 1 |
| Example 74 | Example 65 | 11.9 | 898 | 1 |
| Example 75 | Example 66 | 11.8 | 897 | 6 |
| Example 76 | Example 67 | 11.9 | 895 | 6 |

As shown in Table 5, the tantalum type electrolyte capacitors of Examples 68 to 76 (which hereinafter may be simply referred to as "capacitor") had: an ESR of 11.0 to 13.3 mΩ, thereby satisfying a set value of the ESR to be 20 mΩ or less; a capacitance of 860 to 907 μF, thereby satisfying a set value of the capacitance to be 800 μF or more; and a leak current of 1 to 9 microamperes, thereby satisfying a set value of the leak current to be 100 microamperes or less. In addition, compared with the capacitor of Comparative Example 6 shown in Table 1, it had a lower (smaller) ESR, a larger capacitance, significantly less leak current.

Also, as shown it Table 6, the capacitors of Examples 68 to 76 had the following features. Even after the storage at 150° C. for 240 hours, the increases of ESR and the leak current were little, and the decreases of the capacitance were little. They had an ESR of 11.5 to 13.9 mΩ, thereby satisfying a set value of the ESR to be 20 mΩ or less; a capacitance of 852 to 902 μF, thereby satisfying a set value of the capacitance to be 800 μF or more; and a leak current of 1 to 14 microamperes, thereby satisfying a set value of the leak current to be 100 microamperes or less. Also, in case of these capacitors of Examples 68 to 76, they did not exhibit significant increases of the ESR and the leak current, and significant decrease of the capacitance unlike the capacitor of Comparative Example 6 when it was left under the high temperature storage. Also, their increases of the ESR after the high temperature storage were smaller than the capacitor of Comparative Example 7. Also, their decreases of the capacitance after the high temperature storage were smaller than the capacitor of Comparative Example 8.

The monomer liquids for conductive polymer production of Examples 59 to 67 used in these capacitors of Examples 68 to 76, respectively, correspond to ones in which pyrrole was added in the monomer liquids for conductive polymer production of Examples 41 to 49 used in the capacitors of Examples 50 to 58. By adding pyrrole, the capacitors of Examples 68 to 76 were superior in the capacitor properties to the capacitors of Examples 50 to 58 since the formers had a lower ESR than the latters.

Explanation is provided more in detail. In Example 59, the monomer liquid for conductive polymer production (which may be hereinafter simply referred to as "a monomer liquid"), corresponds to the one in which pyrrole was added in the monomer liquid of Example 41. The capacitor of Example 68 made by using the monomer liquid of Example 59 was superior in the capacitor properties to the capacitor of Example 50 made by using the monomer liquid of Example 41, since the former had low ESR than the latter. Similarly, the monomer liquid of Example 60 corresponds to the one in which pyrrole was added in the monomer liquid of Example 42; the monomer liquid of Example 61 corresponds to the one in which pyrrole was added in the monomer liquid of Example 43; the monomer liquid of Example 62 corresponds to the one in which pyrrole was added in the monomer liquid of Example 44; the monomer liquid of Example 63 corresponds to the one in which pyrrole was in the monomer liquid of Example 45; the monomer liquid of Example 64 corresponds to the one in which pyrrole was added in the monomer liquid of Example 46; the monomer liquid of Example 65 corresponds to the one in which pyrrole was added in the monomer liquid of Example 47; the monomer liquid of Example 66 corresponds to the one in which pyrrole was added in the monomer liquid of Example 48; and the monomer liquid of Example 67 corresponds to the one in which pyrrole was added in the monomer liquid of Example 49. Compare the capacitor of Example 69 with the capacitor of Example 51. Compare the capacitor of Example 70 with the capacitor of Example 52. Compare the capacitor of Example 71 with the capacitor of Example 53. Compare the capacitor of Example 72 with the capacitor of Example 54. Compare the capacitor of Example 73 with the capacitor of Example 55. Compare the capacitor of Example 74 with the capacitor of Example 56. Compare the capacitor of Example 76 with the capacitor of Example 57. In these comparisons, it was found that the capacitors made by using the monomer liquids with pyrrole was superior in the capacitor properties to the capacitors made by using the monomer liquid without pyrrole, since the formers had low ESR than the latters.

[Evaluation of the Electrolyte Capacitor (4)]

In the evaluation of the electrolyte capacitor (4), plain type aluminum electrolyte capacitors were prepared and their characteristics were evaluated.

Example 77

For the capacitor element of the electrolyte capacitor of Example 77, it is made of an aluminum foil whose surface is made porous, which had been designed to have a rated voltage of 25 V, an ESR of 30 mΩ or less, a capacitance of 40 µF or more, and a leak current of 20 µA or less.

Then, the capacitor element above was immersed in the conductive polymer dispersion liquid (I) for one minute, and then it was taken out, and then it was dried at 150° C. for 30 minutes. This operation was repeated twice. Thereby, a first solid electrolyte layer (which may be hereinafter simply referred to as a "first solid electrolyte layer based on the conductive polymer dispersion liquid (I)") was formed.

Then, the capacitor element was immersed in the monomer liquid for conductive polymer production prepared in Example 1 for two minutes, and then, it was taken out, and dried at 50° C. for ten minutes. Then, the capacitor element above was immersed in a 35% ammonium persulfate aqueous solution for two minutes, and then it was taken out. After leaving it still at room temperature (25° C.) for ten minutes, it was heated at 50° C. for 30 minutes for carrying out polymerization. Then, the capacitor element above was immersed for 30 minutes in a cleaning liquid made by mixing pure water with ethanol at a mass ratio of 1:1, and then it was taken out, and then dried at 150° C. for 30 minutes. The operation above was repeated twice. Thereby, on the capacitor element, formed was a second solid electrolyte layer made of the conductive polymer based on the monomer liquid for conductive polymer production of Example 1.

Furthermore, the capacitor element above was immersed in the conductive polymer dispersion liquid (II) for one minute, and then it was taken out, and then it was dried at 150° C. for 30 minutes. Thereby, on the second solid electrolyte layer, formed was a third solid electrolyte layer prepared by immersing into the conductive polymer dispersion liquid (II) followed by drying (which is hereinafter simply referred to as "third solid electrolyte layer based on the conductive polymer dispersion liquid (II)."

Then, the solid electrolyte layer was coated with carbon paste and silver paste to obtain an aluminum type electrolyte capacitor of Example 77.

Examples 78 to 84

Except for replacing the monomer liquid for conductive polymer production prepared in Example 1 with the monomer liquids for conductive polymer productions prepared in Examples 2, 4, 5, 59, 62, 63 and 64, respectively, the same procedures as Example 77 were carried out to produce aluminum type electrolyte capacitors of Examples 78 to 84.

Comparative Example 9

The second solid electrolyte layer based on the monomer liquid for conductive polymer production of Example 1 was not formed on the capacitor element, Other than the change noted here, the same procedure as Example 77 was performed to obtain an aluminum type solid electrolyte capacitor of Comparative Example 9.

Comparative Example 10

The capacitor element having formed a first solid electrolyte layer in the same procedure as Example 77 was immersed in an ethanol solution of 30% ethylenedioxythiophene for two minutes, and then it was taken out, and was left at room temperature for ten minutes. Then, it was immersed in an ethanol solution of 40% ferric p-toluenesulfonate for 30 seconds, and it was taken out, and left at room temperature for ten minutes. Then, it was heated at 50° C. for 30 minutes for carrying out polymerization. Then, the capacitor element above was immersed for 30 minutes in a cleaning liquid made by mixing pure water with ethanol at a mass ratio of 1:1, and then it was taken out, and then dried at 150° C. for 30 minutes. The operation above was repeated twice. Thereby, on the capacitor element, formed was a second solid electrolyte layer made of a conductive polymer by using ferric p-toluenesulfonate as an oxidant and dopant agent.

Then, the capacitor element above was immersed in the conductive polymer dispersion liquid (II) for one minute, and then it was taken out, and then it was dried at 150° C. for 30 minutes. Thereby, on the second solid electrolyte layer, formed was a third solid electrolyte layer prepared by immersing into the conductive polymer dispersion liquid (II) followed by drying (which is hereinafter simply referred to as "third solid electrolyte layer based on the conductive polymer dispersion liquid (II)."

Then, the solid electrolyte layer was coated with carbon paste and silver paste to obtain an aluminum type electrolyte capacitor of Comparative Example 10.

With respect to the aluminum type electrolyte capacitors of Examples 77 to 84 and Comparative Examples 9 and 10 as produced above, the ESR and the capacitance were measured, as well as the leakage current was measured in the same manner as described before. The results are shown in Table 7 in the same manner as Table 1. Here, it is noted that since the rated voltage of these electrolyte capacitors was 25V, the measurement of the leak current was carried out by applying a rated voltage of 25V to electrolyte capacitor.

TABLE 7

| | Initial Characteristic | | | |
|---|---|---|---|---|
| | Kind of Monomer Liquid | ESR (mΩ) | Capacitance (μF) | Leak Current (μA) |
| Example 77 | Example 1 | 25.3 | 41.1 | 11 |
| Example 78 | Example 2 | 26.1 | 41.1 | 11 |
| Example 79 | Example 4 | 23.4 | 41.2 | 9 |
| Example 80 | Example 5 | 23.5 | 41.2 | 10 |
| Example 81 | Example 59 | 24.1 | 41.2 | 9 |
| Example 82 | Example 62 | 23.9 | 41.3 | 3 |
| Example 83 | Example 63 | 22.0 | 41.3 | 1 |
| Example 84 | Example 64 | 22.1 | 41.3 | 1 |
| Comp. Ex. 9 | — | 30.4 | 38.5 | 9 |
| Comp. Ex. 10 | — | 24.6 | 41.4 | 25 |

Also, after the measurements of the initial characteristics as shown in Table 7 above, the aluminum type electrolyte capacitors of Examples 77 to 84 and Comparative Examples 9 to 10 were left at a still state in a dryer at 150° C. for 240 hours. On the capacitors after the storage, the ESR, the capacitance and the leakage current were measured in the same manner as before. The results are shown in Table 8 in the same manner as Table 7.

TABLE 8

| | After storage at 150° C. for 240 hours | | | |
|---|---|---|---|---|
| | Kind of Monomer Liquid | ESR (mΩ) | Capacitance (μF) | Leak Current (μA) |
| Example 77 | Example 1 | 26.1 | 40.5 | 8 |
| Example 78 | Example 2 | 26.8 | 40.6 | 8 |
| Example 79 | Example 4 | 23.9 | 40.9 | 5 |
| Example 80 | Example 5 | 24.0 | 40.9 | 6 |
| Example 81 | Example 59 | 24.8 | 40.7 | 6 |
| Example 82 | Example 62 | 24.4 | 40.7 | 2 |
| Example 83 | Example 63 | 22.5 | 41.0 | 1 |
| Example 84 | Example 64 | 22.5 | 41.0 | 1 |
| Comp. Ex. 9 | — | 31.0 | 35.2 | 5 |
| Comp. Ex. 10 | — | 33.3 | 39.8 | 79 |

As shown in Table 7, the aluminum type electrolyte capacitors of Examples 77 to 84 (which hereinafter may be simply referred to as "capacitor") had: an ESR of 21.4 to 26.1 mΩ, thereby satisfying a set value of the ESR to be 30 mΩ or less; a capacitance of 41.1 to 41.4 μF, thereby satisfying a set value of the capacitance to be 40 μF or more; and a leak current of 1 to 12 μA, thereby satisfying a set value of the leak current to be 20 μA or less. In addition, compared with the capacitor of Comparative Examples 9 to 10, they were superior in the capacitor properties since they had a lower ESR.

Also, as shown it Table 8, the capacitors of Examples 77 to 84 had the following features. Even after the storage at 150° C. for 240 hours, the increases of ESR and the leak current were little, and the decreases of the capacitance were little. They had an ESR of 21.9 to 26.8 mΩ, thereby satisfying a set value of the ESR to be 30 mΩ or less; a capacitance of 40.5 to 41.1 μF, thereby satisfying a set value of the capacitance to be 40 μF or more; and a leak current of 2 to 8 μA, thereby satisfying a set value of the leak current to be 20 μA or less.

Here, the capacitors of Comparative Examples 9 to 10 are noted as follows. The capacitor of Comparative Example 9 was prepared without having on the capacitor element forming a second solid electrolyte layer made of the conductive polymer based on the monomer liquid for conductive polymer production of the present invention. Although it had little leak current, the ESR was higher than capacitors of Examples 77 to 84, and the capacitance was smaller.

Also, the capacitor of Comparative Example 10 was prepared by forming the second solid electrolyte layer made of the conductive polymer by using ferric p-toluenesulfonate as an oxidant and dopant agent. It had a large leak current, and was significant in the increase of the ESR after the high temperature storage, the increase of the ESR, and the decrease of the capacitance. In particular, it showed a large increase of the leak current.

INDUSTRIAL UTILITY

According to the present invention, there can be provided a monomer liquid for conductive polymer production, which can produce an electrolyte capacitor having a low ESR, superior heat resistance and low leak current, and reliability of preservation properties. Using the monomer liquid for conductive polymer production above, there can be prepared an electrolyte capacitor having the characteristics as mentioned above.

What is claimed is:
1. A monomer liquid for conductive polymer production, consisting of:

a monomer selected from the group consisting of thiophene or its derivatives, pyrrole or its derivative and aniline or its derivative;
a dopant selected from the group consisting of a naphthalene sulfonic acid type heterocyclic compound and a benzene sulfonic acid type heterocyclic compound in which no hydroxyl group is directly connected to the benzene ring, wherein said at least one kind is dispersed in said at least one monomer,
optionally, an organic solvent,
optionally, a compound having a glycidyl group or its ring-opening compound, and
optionally, a silane compound.

2. The monomer liquid for conductive polymer production according to claim 1, wherein the naphthalene sulfonic acid type heterocyclic compound is at least one selected from the group consisting of naphthalene monosulfonic acid heterocyclic compound and naphthalene trisulfonic acid heterocyclic compound.

3. The monomer liquid for conductive polymer production according to claim 1, wherein the heterocycle of the naphthalene sulfonic acid type heterocyclic compound includes nitrogen atom.

4. The monomer liquid for conductive polymer production according to claim 1, wherein the heterocyclic compound moiety in the naphthalene sulfonic acid type heterocyclic compound is selected from the group consisting of imidazole, 1-methylimidazole, 2-methylimidazole, 4-methylimidazole, 2-ethyl-4-methylimidazole, imidazole, 2-methyl-4-ethylimidazole, triazole, triazine, pyridine, morpholine, and piperazine.

5. The monomer liquid for conductive polymer production according to claim 1, wherein the benzene sulfonic acid type heterocyclic compound is selected from the group consisting of a benzene sulfonic acid heterocyclic compound, a benzene sulfonic acid heterocyclic compound having an alkyl group, benzene sulfonic acid heterocyclic compound having an alkoxy group, and a benzene sulfonic acid heterocyclic compound having a nitro group.

6. The monomer liquid for conductive polymer production according to claim 1, wherein the heterocycle of the naphthalene sulfonic acid type heterocyclic compound includes nitrogen atom.

7. The monomer liquid for conductive polymer production according to claim 1, wherein the heterocyclic compound moiety in the benzene sulfonic acid type heterocyclic compound is selected from the group consisting of imidazole, 1-methylimidazole, 2-methylimidazole, 4-methylimidazole, 2-ethyl-4-methylimidazole, imidazole, 2-methyl-4-ethylimidazole, triazole, triazine, pyridine, morpholine, and piperazine.

8. The monomer liquid for conductive polymer production according to claim 1, wherein a ratio is 1:0.1 to 0.1:1, the ratio being a mass ratio of the monomer to said at least one kind selected from the group consisting of a naphthalene sulfonic acid type heterocyclic compound and a benzene sulfonic acid type heterocyclic compound in which no hydroxyl group is directly connected to the benzene ring.

9. The monomer liquid for conductive polymer production according to claim 1, wherein the organic solvent is an alcohol having a carbon number of 1 to 4.

10. The monomer liquid for conductive polymer production according to claim 1, wherein the monomer is thiophene or its derivative.

11. The monomer liquid for conductive polymer production according to claim 10, wherein the derivative of thiophene is represented by formula (1) below:

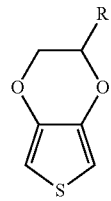

(1)

where R represents hydrogen or an alkyl group having a carbon number of 1 to 4.

12. The monomer liquid for conductive polymer production according to claim 1, wherein the monomer is a mixture of thiophene or its derivative with pyrrole or its derivative, wherein the pyrrole or its derivative is included at 1 to 100% by mass standard with respect to the thiophene or its derivative.

13. The monomer liquid for conductive polymer production according to claim 1, wherein the monomer liquid for conductive polymer production does not make precipitations even after being left at a condition of 20° C. for six months.

14. A method for producing an electrolyte capacitor, comprising a first step of impregnating a capacitor element with the monomer liquid for conductive polymer production of claim 1, followed by impregnating the capacitor element with an oxidant solution to polymerize a monomer, the first step being repeated at least one time, thereby forming a first solid electrolyte layer made of a first conductive polymer.

15. The method for producing an electrolyte capacitor according to claim 14, wherein after the first step to form the first solid electrolyte layer made of the first conductive polymer; the step further comprising a second step in which the capacitor element is impregnated with a first conductive polymer dispersion liquid followed by drying, the second step being repeated at least one time, thereby forming a second solid electrolyte layer made of a second conductive polymer.

16. The method for producing an electrolyte capacitor according to claim 14, wherein before the first step to form the first solid electrolyte layer made of the first conductive polymer, the step further comprising a step of impregnating a capacitor element with a conductive polymer dispersion liquid followed by drying, the step being repeated at least one time; the performing the first step; and after the first step, performing a second step of impregnating the capacitor element with a second conductive polymer dispersion liquid followed by drying, said second step being repeated at least one time, thereby forming a second solid electrolyte layer made of a second conductive polymer.

17. A capacitor comprising a solid electrolyte including a conductive polymer made by using the monomer liquid of claim 1.

18. A method for preparing a solid electrolyte including a conductive polymer made by using the monomer liquid of claim 1.

* * * * *